US009896873B2

(12) United States Patent
Uchitsunemi et al.

(10) Patent No.: US 9,896,873 B2
(45) Date of Patent: Feb. 20, 2018

(54) TENSION APPLYING APPARATUS, DRUM APPARATUS AND OPENING AND CLOSING BODY DRIVE APPARATUS FOR VEHICLE

(71) Applicant: AISIN SEIKI KABUSHIKI KAISHA, Kariya-shi (JP)

(72) Inventors: Masayuki Uchitsunemi, Chiryu (JP); Kazuhiro Nakashizu, Kariya (JP); Yoshichika Ito, Toyoake (JP); Tetsuya Ikeda, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/319,047

(22) PCT Filed: May 26, 2015

(86) PCT No.: PCT/JP2015/065106

§ 371 (c)(1),
(2) Date: Dec. 15, 2016

(87) PCT Pub. No.: WO2015/194332

PCT Pub. Date: Dec. 23, 2015

(65) Prior Publication Data

US 2017/0130507 A1 May 11, 2017

(30) Foreign Application Priority Data

Jun. 20, 2014 (JP) ................................. 2014-126980

(51) Int. Cl.
*B60J 5/06* (2006.01)
*E05F 15/643* (2015.01)
*E05F 15/655* (2015.01)

(52) U.S. Cl.
CPC .......... *E05F 15/643* (2015.01); *E05F 15/655* (2015.01); *E05Y 2900/531* (2013.01)

(58) Field of Classification Search
CPC ..... E05F 15/643; E05F 15/646; E05F 15/655; E05Y 2900/531
See application file for complete search history.

(56) References Cited

U.S. PATENT DOCUMENTS 4,932,715 A * 6/1990 Kramer ...................... B60J 5/06 296/155
5,737,875 A * 4/1998 Dowling ................ E05B 81/20 474/134

(Continued)

FOREIGN PATENT DOCUMENTS

JP 2004-300827 A 10/2004

OTHER PUBLICATIONS

English Translation of the International Preliminary Report on Patentability and Written Opinion dated Dec. 20, 2016 in PCT/JP2015/065106.

(Continued)

*Primary Examiner* — Katherine W Mitchell
*Assistant Examiner* — Abe Massad
(74) *Attorney, Agent, or Firm* — Oblon, McClelland, Maier & Neustadt, L.L.P.

(57) ABSTRACT

A tension applying apparatus includes a tension applying member applying a tensile force to a drive cable by being pressed against the drive cable, a biasing member generating a biasing force for pressing the tension applying member against the drive cable, a holding member including a guide portion which restricts a moving direction of the tension applying member and a housing member housing the tension applying member and the holding member. The holding member is configured to change the moving direction of the tension applying member which is guided by the guide portion in a state where the holding member including a rotation shaft is housed within the housing member. The housing member includes a holding structure holding the (Continued)

holding member at a position to which the holding member rotates in a direction where a pressing angle of the tension applying member relative to the drive cable becomes shallow.

6 Claims, 11 Drawing Sheets

(56) References Cited

U.S. PATENT DOCUMENTS

| | | | | |
|---|---|---|---|---|
| 5,806,246 | A * | 9/1998 | Azuma | B60J 5/062<br>49/360 |
| 6,009,671 | A * | 1/2000 | Sasaki | E05F 15/646<br>296/146.1 |
| 6,198,242 | B1 * | 3/2001 | Yokomori | E05F 15/646<br>192/54.5 |
| 7,287,804 | B2 * | 10/2007 | Yamagishi | E05F 15/646<br>296/146.4 |
| 7,774,985 | B2 | 8/2010 | Miyagawa et al. | |
| 8,857,104 | B2 * | 10/2014 | Ishigaki | E05F 15/10<br>49/209 |
| 2004/0195419 | A1 | 10/2004 | Yamagishi et al. | |
| 2016/0348768 | A1 * | 12/2016 | Urano | H02K 5/24 |

OTHER PUBLICATIONS

International Search Report dated Aug. 4, 2015 in PCT/JP2015/065106 filed May 26, 2015.

* cited by examiner

TENSION APPLYING APPARATUS, DRUM APPARATUS AND OPENING AND CLOSING BODY DRIVE APPARATUS FOR VEHICLE

TECHNICAL FIELD

The present invention relates to a tension applying apparatus, a drum apparatus and an opening and closing body drive apparatus for a vehicle.

BACKGROUND ART

A tension applying apparatus is normally provided at an opening and closing body drive apparatus for a vehicle that drives an opening and closing body with a drive cable. The tension applying apparatus may apply a tensile force to the drive cable. For example, a slide door apparatus disclosed in Patent document 1 includes two drive cables pulling a slide door of the slide door apparatus in an opening direction and a closing direction. A tension applying apparatus provided at the slide door apparatus is provided at a drum apparatus which is configured to reel in one of the two drive cables while reeling out the other of the two drive cables.

That is, the tension applying apparatus is provided at the drum apparatus so as to absorb looseness generated at the drive cable which is reeled out. The slide door may be smoothly pulled accordingly.

Specifically, in many cases, the tension applying apparatus as described above, for example, is configured to apply the tensile force to the drive cable by biasing a tension applying member based on an elastic resilience of a spring member to press the tension applying member against the drive cable. For example, in the tension applying apparatus disclosed in Patent document 1, a pulley is employed as the tension applying member. In addition, the tension applying apparatus includes a guide portion (guide groove) extending in a direction intersecting with the drive belt. A movement of the pulley along the guide groove is allowed to thereby apply an appropriate tensile force to the drive cable against which the pulley is pressed.

Further, a bent portion is provided at a base end side of the guide groove so that a rotation shaft of the pulley which is inserted to be positioned within the guide groove is engageable with the guide groove. That is, the tension applying member is engaged so that a biasing force stored at the spring member is inhibited from being transmitted to the drive cable. In the aforementioned known tension applying apparatus, by the use of such construction, the pulley may be retained at a position where a force for pressing the pulley against each of the drive cables is weakened. As a result, in a case where the drive cables are connected to the slide door, it is constructed that an amount of looseness of each of the drive cables increases to thereby simplify the connection operation of the drive cables.

DOCUMENT OF PRIOR ART

Patent Document

Patent document 1: JP2004-300827A

OVERVIEW OF INVENTION

Problem to be Solved by Invention

Nevertheless, according to the aforementioned known construction, in order to increase the amount of looseness of each of the drive cables upon the connection operation by weakening the force with which the tension applying member is pressed against the drive cable, the guide groove is elongated, which increases a stroke amount of the tension applying member. As a result, appropriate tension application and downsizing of the apparatus may be inhibited, for which improvement may be considered.

An object of the present invention is to provide a tension applying apparatus, a drum apparatus and an opening and closing body drive apparatus for a vehicle which may ensure a greater amount of looseness of a drive cable without an increase of a stroke amount of a tension applying member.

Means for Solving Problem

A first aspect for achieving the aforementioned object provides a tension applying apparatus. The tension applying apparatus includes a tension applying member applying a tensile force to a drive cable by being pressed against the drive cable, a biasing member generating a biasing force for pressing the tension applying member against the drive cable, a holding member including a guide portion which restricts a moving direction of the tension applying member and a housing member housing the tension applying member and the holding member. The holding member is configured to change the moving direction of the tension applying member which is guided by the guide portion in a state where the holding member including a rotation shaft is housed within the housing member. The housing member includes a holding structure holding the holding member at a position to which the holding member rotates in a direction where a pressing angle of the tension applying member relative to the drive cable becomes shallow.

A second aspect for achieving the aforementioned object provides a drum apparatus including a motor, a drum rotating by the motor serving as a drive source, a drum housing portion housing the drum and a tension applying apparatus according to the first aspect, the tension applying apparatus being provided at the drum housing portion.

A third aspect for achieving the aforementioned object provides an opening and closing body drive apparatus for a vehicle including an opening and closing body, a plurality of guide rails, a plurality of guide roller units connecting the opening and closing body and the guide rails to one another and a tension applying apparatus according to the first aspect.

MODE FOR CARRYING OUT THE INVENTION

Figure 1:
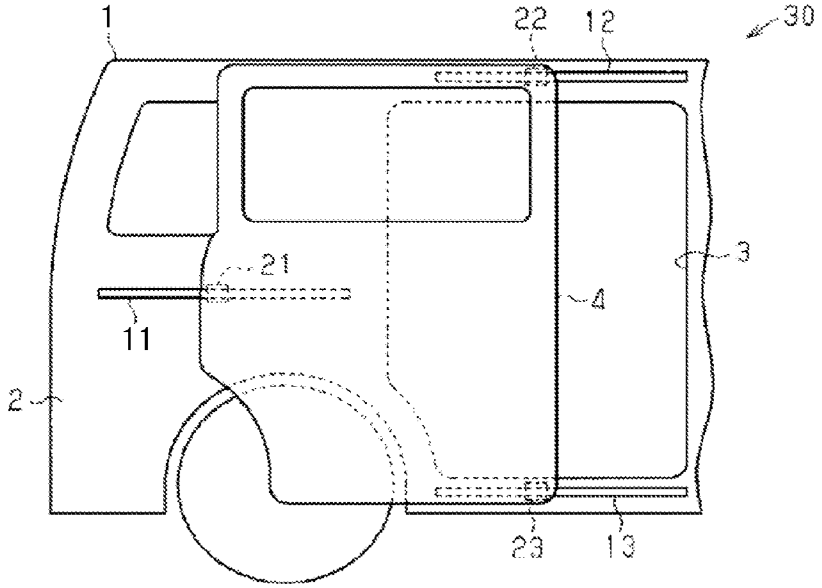
FIG. 1 is an explanatory view of a slide door provided at a side surface of a vehicle body.

A tension applying apparatus, a drum apparatus and an opening and closing body drive apparatus for a vehicle according to an embodiment of the invention are explained below with reference to drawings. As illustrated in FIG. 1, a vehicle 1 of the embodiment includes a slide door apparatus 30 serving as an opening and closing body drive apparatus for a vehicle. The vehicle 1 includes a slide door 4 configured to open and close a door opening portion 3 provided at a side surface of a vehicle body 2 in a state where the slide door 4 moves in a vehicle front-rear direction (in a left-right direction in FIG. 1). The slide door 4 corresponds to an opening and closing body.

Specifically, plural guide rails 11 to 13 extending in the front-rear direction are provided at the side surface of the vehicle body 2. The guide rails 11 to 13 include a center rail 11, an upper rail 12 and a lower rail 13 provided at a rear, an upper edge portion and a lower edge portion (at a left side, an upper side and a lower side in FIG. 1) of the door opening portion 3, respectively. The slide door 4 is connected to the guide rails 11 to 13 via guide roller units 21 to 23. The guide roller units 21 to 23 include guide rollers (not illustrated) rolling on respective paths obtained by the corresponding guide rails 11 to 13. The guide roller units 21 to 23 support the slide door 4 at the vehicle body 2 (specifically, the guide rails 11 to 13) so that an opening and closing operation of the slide door 4 that moves forward and rearward along the guide rails 11 to 13 is available. The slide door 4, the guide rails 11 to 13 and the guide roller units 21 to 23 constitute the slide door apparatus 30.

Figure 2:
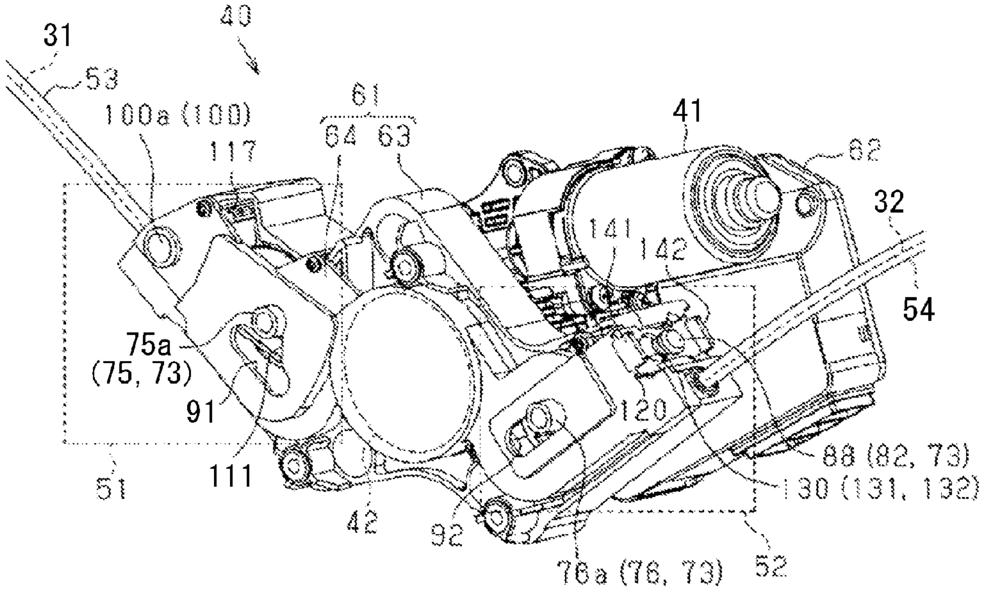
FIG. 2 is a perspective view illustrating a drum apparatus in a temporary holding state and tension applying apparatuses provided at the drum apparatus.
Figure 3:
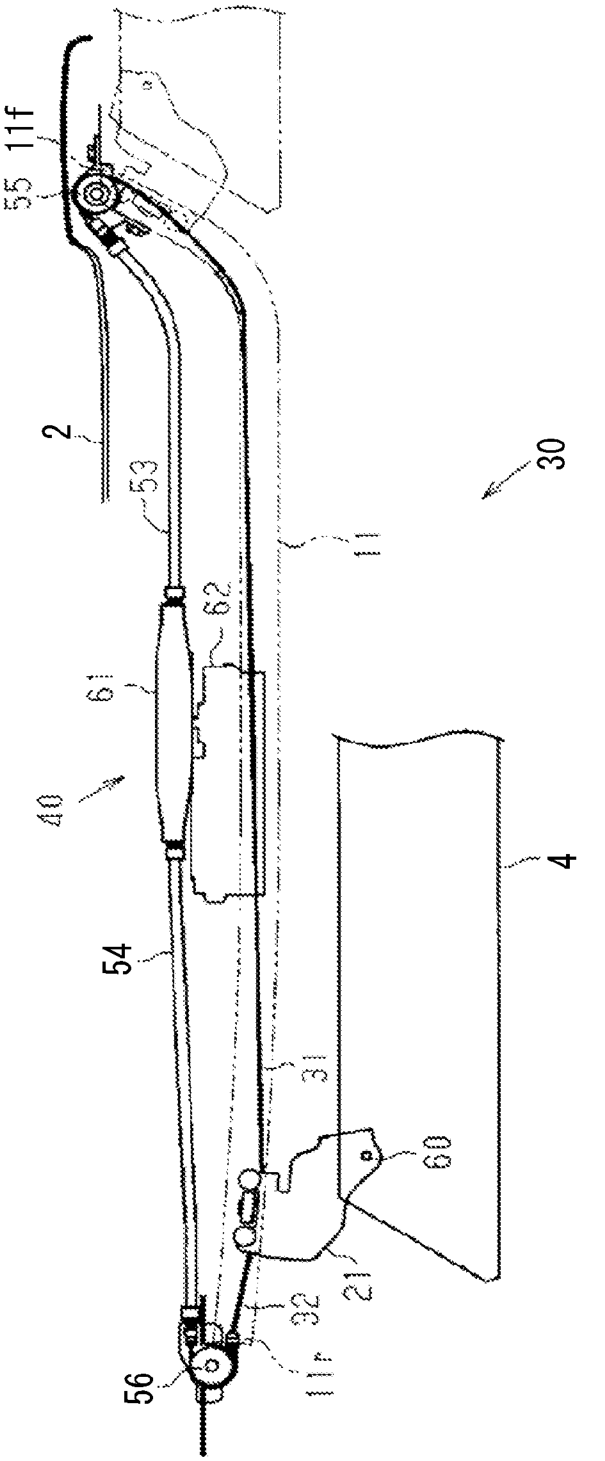
FIG. 3 is a schematic configuration view of a slide door apparatus.

As illustrated in FIGS. 2 and 3, the slide door apparatus 30 of the embodiment includes two drive cables 31 and 32 arranged along an extending direction of the center rail 11 and a drum apparatus 40 configured to reel out one of the two drive cables 31 and 32 and reel in the other of the two drive cables 31 and 32. In the embodiment, respective ends of the drive cables 31 and 32 are connected to the guide roller unit 21 in directions opposite from each other. Accordingly, the slide door apparatus 30 of the embodiment is configured to pull the slide door 4 supported at the guide roller unit 21 selectively in an opening direction and a closing direction.

Specifically, as illustrated in FIG. 2, the drum apparatus 40 of the embodiment includes a drum 42 rotating by a motor 41 serving as a drive source. That is, base ends of the drive cables 31 and 32 are connected to the drum 42. The drum apparatus 40 is configured to reel out one of the drive cables 31 and 32 while reeling in the other of the drive cables 31 and 32 based on a rotation direction of the drum 42.

The drum apparatus 40 of the embodiment also includes tension applying apparatuses 51 and 52 configured to apply respective tensile forces to the drive cables 31 and 32. Each of the tension applying apparatuses 51 and 52 operates to absorb looseness of each of the drive cables 31 and 32 which occurs when each of the drive cables 31 and 32 is reeled out. As a result, the slide door 4 may be pulled smoothly.

As illustrated in FIG. 3, the drum apparatus 40 is arranged within the vehicle body 2 in the vicinity of the center rail 11, specifically, at a substantially center portion of the center rail 11 in a longitudinal direction thereof. Two guide tubes 53 and 54 extending to a front side and a rear side of the vehicle are connected to the drum apparatus 40. The drive cables 31 and 32 are configured to be pulled out adjacent to a front end 11*f* (in the vicinity of a right end portion in FIG. 3) and adjacent to a rear end 11*r* (in the vicinity of a left end portion in FIG. 3) of the center rail 11 via the guide tubes 53 and 54.

In the present embodiment, pulleys 55 and 56 are provided adjacent to the front end 11*f* and the rear end 11*r* of the center rail 11 respectively. The drive cables 31 and 32 are wound at the pulleys 55 and 56 respectively so as to be arranged along the extending direction of the center rail 11.

Specifically, the first drive cable 31 which is pulled towards the front end 11*f* of the center rail 11 via the guide tube 53 is wound at the pulley 55 in the vicinity of the front end 11*f* so as to be routed towards the rear end 11*r* from the front end 1 if along the extending direction of the center rail 11. The second drive cable 32 which is pulled towards the rear end 11*r* of the center rail 11 via the guide tube 54 is wound at the pulley 56 in the vicinity of the rear end 11*r* so as to be routed towards the front end 11*f* from the rear end 11*r* along the extending direction of the center rail 11.

That is, in the slide door apparatus 30 of the embodiment, the drum apparatus 40 operates to reel in the first drive cable 31 so that the guide roller unit 21 pulled by the first drive cable 31 moves towards the front end 1 if of the center rail 11. In addition, the second drive cable 32 is reeled in so that the guide roller unit 21 pulled by the second drive cable 32 moves towards the rear end 11*r* of the center rail 11. In the slide door apparatus 30 of the embodiment, the slide door 4 supported by the guide roller unit 21 is configured to open and close accordingly.

In a state where the slide door 4 of the embodiment is at a fully closed position (a position illustrated with alternate long and two short dashes line in FIG. 3) to which the slide door 4 moves forward in the vehicle, the slide door 4 is arranged so that a decorative surface of the slide door 4 is substantially coplanar with the side surface of the vehicle body 2 at which the center rail 11 is provided. In a case where the slide door 4 moves rearward in the vehicle (left side in FIG. 3) by the opening operation, the slide door 4 is arranged at an outer side in a vehicle width direction (lower side in FIG. 3) than the side surface of the vehicle body 2 so as not to interfere with the side surface of the vehicle body. In the embodiment, a front portion (right side in FIG. 5) of each of the guide rails 11 to 13 in the vehicle is curved towards an inner side in the vehicle width direction (upper side in FIG. 3) so as to secure an opening and closing operation of the slide door 4.

In the embodiment, in a case where the guide roller unit 21 passes through the aforementioned curving portion provided at each of the guide rails 11 to 13, the guide roller unit 21 is configured to rotate relative to the curving portion about a rotation axis 60. As a result, according to the slide door apparatus 30 of the embodiment, the slide door 4 may maintain a state being arranged substantially parallel to the side surface of the vehicle body 2 regardless of an operation position of the slide door 4.

(Tension Applying Apparatus)

Next, constructions of the tension applying apparatuses 51 and 52 provided at the drum apparatus 40 of the embodiment are explained.

As illustrated in FIGS. 2 and 3, the drum apparatus 40 of the embodiment includes a drum housing portion 61 which internally houses the drum 42 and a motor drive portion 62 which houses a reducer for reducing rotations of the motor 41 and a component such as a control board, for example (not illustrated). The tension applying apparatuses 51 and 52 of the embodiment are provided integrally with the drum housing portion 61.

Figure 4:
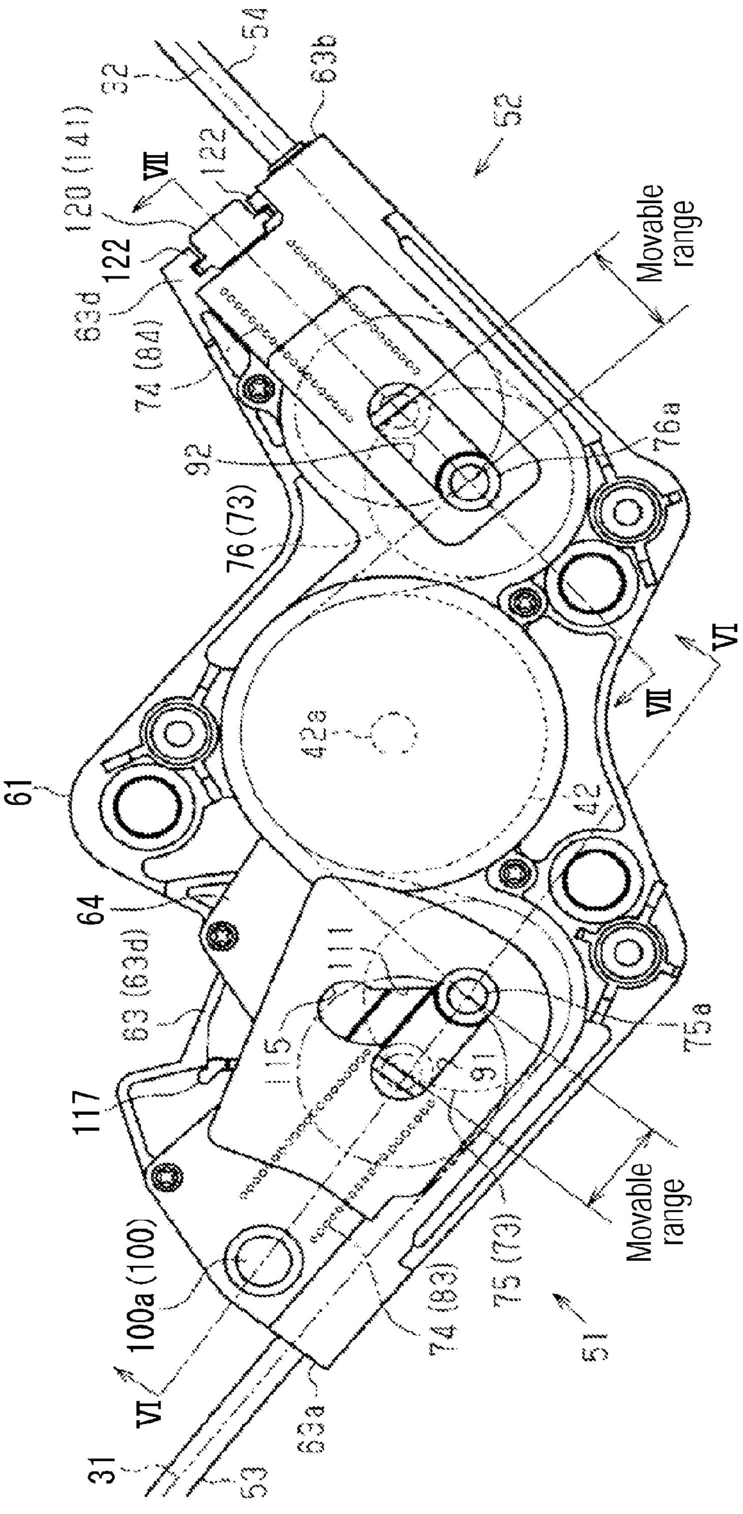
FIG. 4 is a side view illustrating the drum apparatus with a cover member and the tension applying apparatuses provided at the drum apparatus after a connection operation of drive cables.
Figure 5:
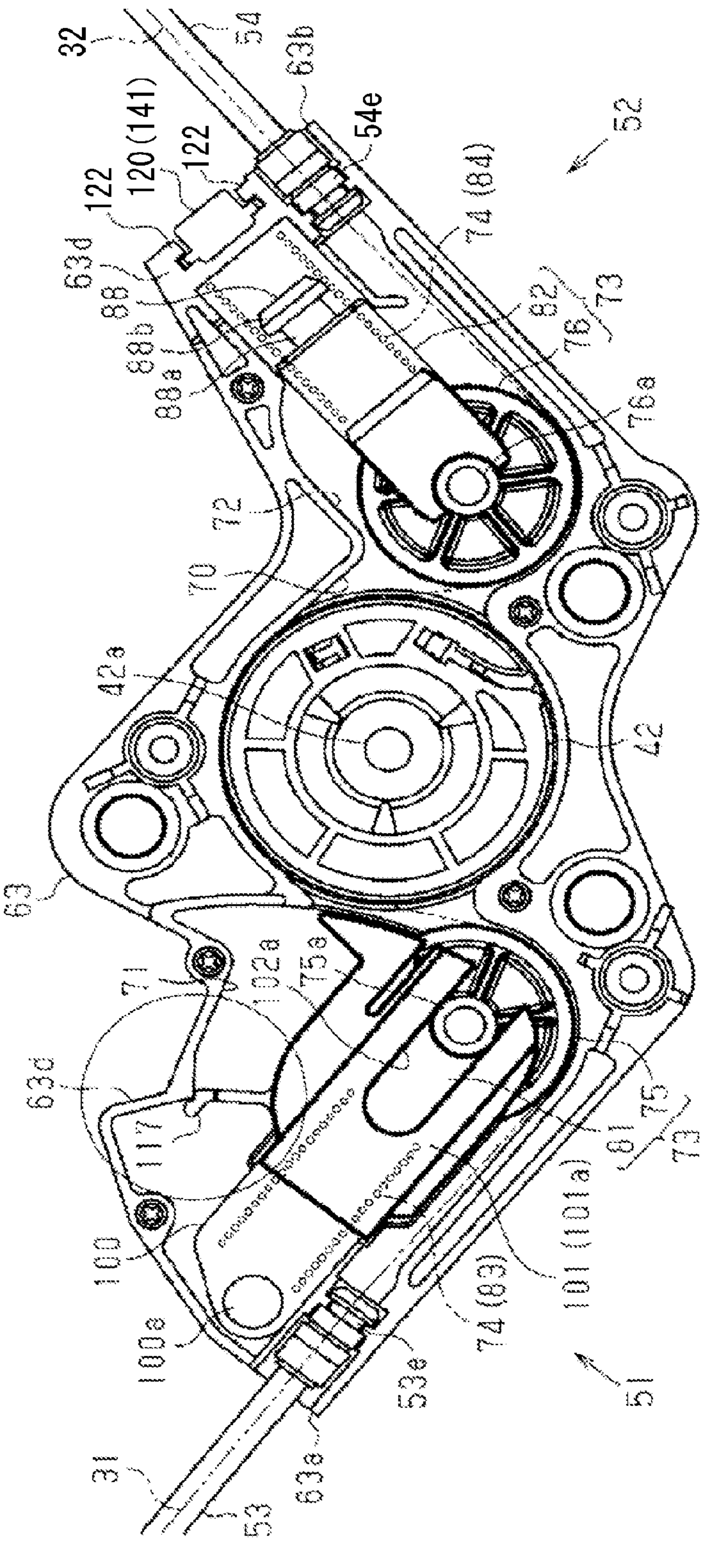
FIG. 5 is a side view illustrating the drum apparatus without the cover member and the tension applying apparatuses provided at the drum apparatus after the connection operation of the drive cables.

Specifically, as illustrated in FIGS. 4 to 7, the drum housing portion 61 of the embodiment includes a housing 63 in a flat box form with a bottom and a cover member 64 covering an opening portion of the housing 63. Specifically, as illustrated in FIGS. 4 and 5, the housing 63 of the embodiment includes an outer configuration in a substantially W-shaped form as in a side view viewed from the cover member 64 attached to the opening portion of the housing 63. The drum 42 is housed within a center housing portion 70 provided at a substantially center portion of the W-shaped configuration.

Further specifically, the drum 42 of the embodiment is housed in the center housing portion 70 in a state where a rotation shaft 42*a* of the drum 42 is substantially orthogonal to a bottom wall 63*c* of the housing 63 and the cover member 64. The drum housing portion 61 of the embodiment includes a first housing portion 71 and a second housing portion 72 positioned to sandwich therebetween the center housing portion 70 in a radial direction of the drum 42 which is housed in the center housing portion 70. Further, in the embodiment, the guide tubes 53 and 54 are connected to respective end portions 63*a* and 63*b* of the housing 63 in the substantially W-shaped form. The drive cables 31 and 32 are reeled in by the drum 42 housed in the center housing portion 70 in a state where the drive cables 31 and 32 are routed within the first housing portion 71 and the second housing portion 72 connected to the guide tubes 53 and 54 where the drive cables 31 and 32 are inserted to be positioned.

Figure 6:
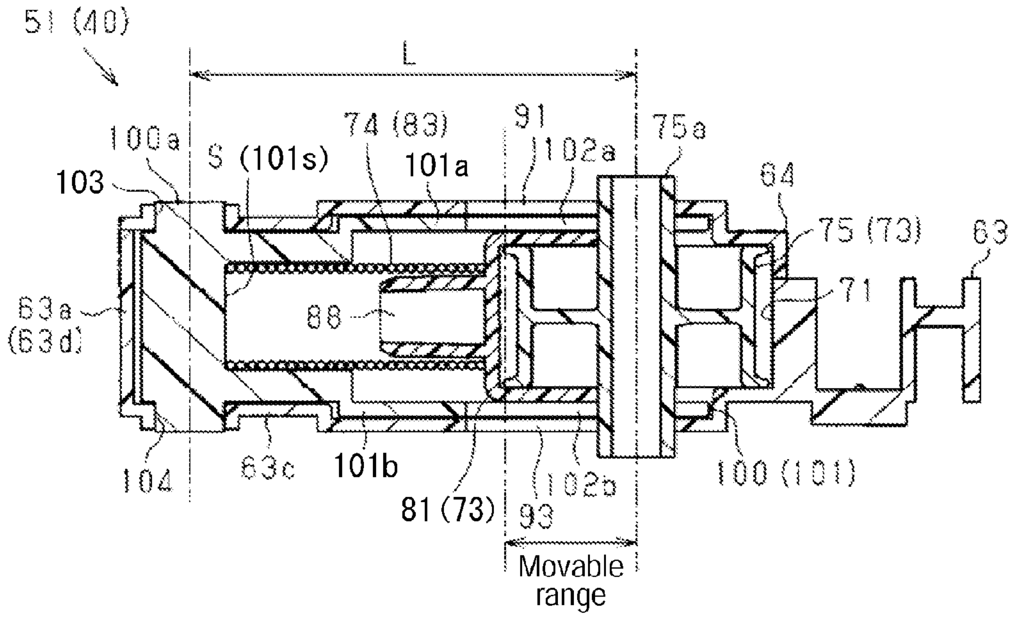
FIG. 6 is a cross-sectional view of the first tension applying apparatus after the connection operation of the drive cables, the cross-sectional view being taken along a line VI-VI in FIG. 4.
Figure 7:
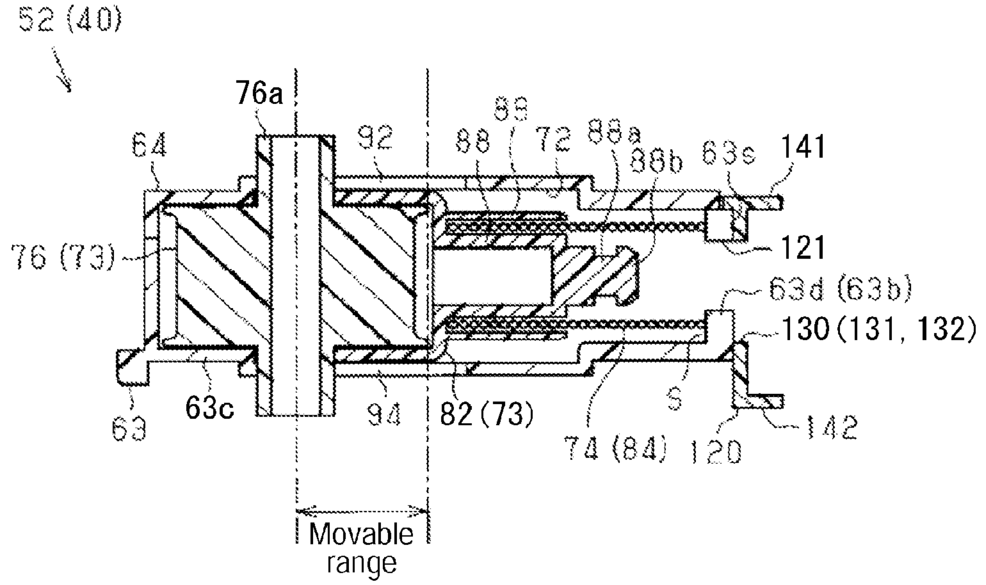
FIG. 7 is a cross-sectional view of the second tension applying apparatus after the connection operation of the drive cables, the cross-sectional view being taken along a line VII-VII in FIG. 4.
Figure 8:
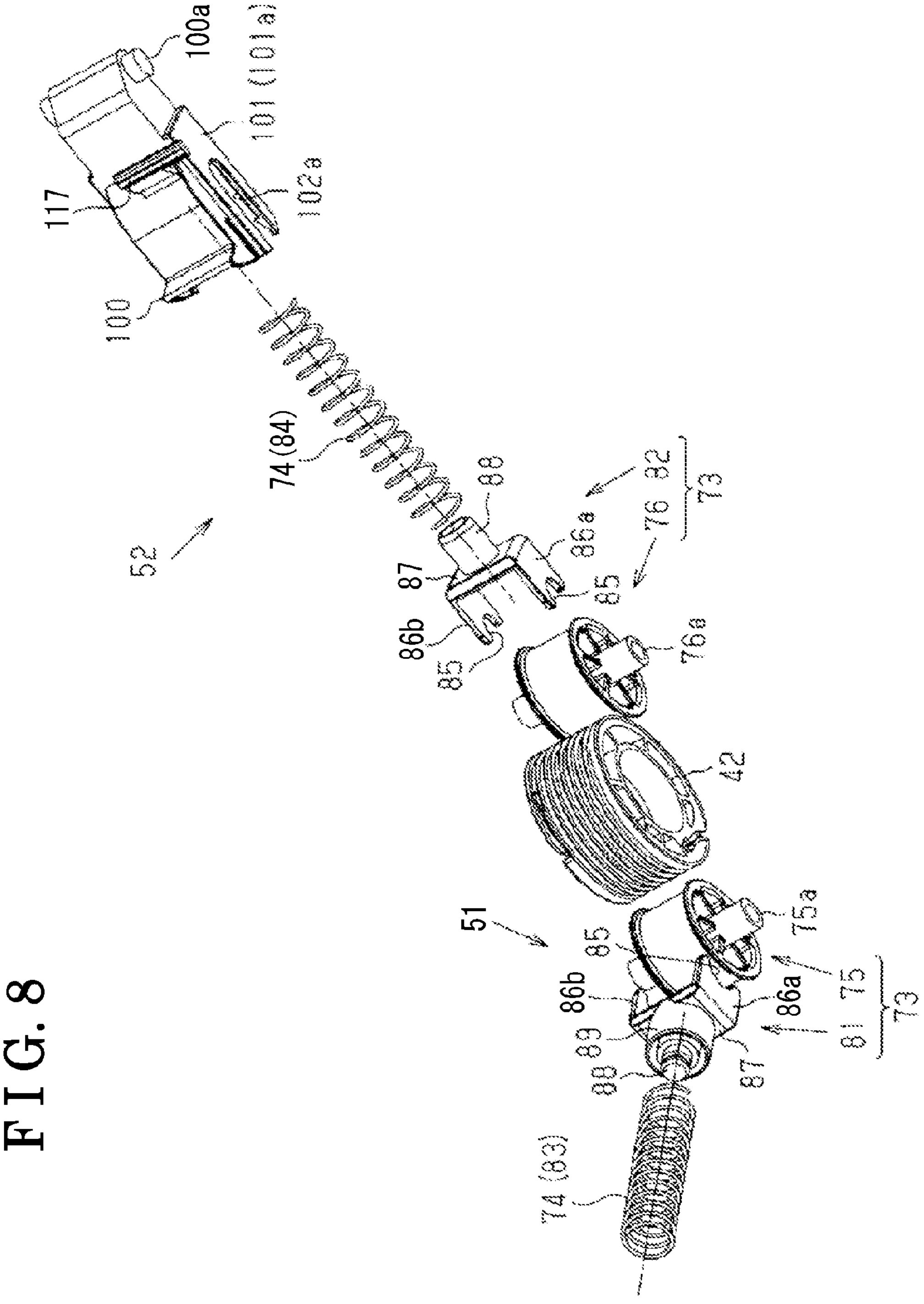
FIG. 8 is an exploded perspective view of the tension applying apparatuses.

As illustrated in FIGS. 6 to 8, each of the tension applying apparatuses 51 and 52 of the embodiment includes a tension applying member 73 and a biasing member 74. The tension applying member 73 may apply the tensile force to the corresponding drive cable 31 or 32 while being pressed against the drive cable 31 or 32. The biasing member 74 is configured to generate a biasing force for pressing the tension applying member 73 to the corresponding drive cable 31 or 32.

Specifically, the tension applying members 73 of the embodiment are configured by including pulleys 75 and 56 pressed against the respective drive cables 31 and 32 and support members 81 and 82 rotatably supporting the pulleys 75 and 76. Coil springs (compression coil springs) 83 and 84 each of which generates the biasing force depending on an elastic deformation amount are employed as the respective biasing members 74. In the drum apparatus 40 of the embodiment, the pulley 75 and the support member 81 constituting the tension applying member 73 and the coil spring 83 serving as the biasing member 74 are housed within the first housing portion 71 where the drive cable 31 to which the tensile force of the tension applying member 73 is applied is routed. In addition, in the drum apparatus 40 of the embodiment, the pulley 76 and the support member 82 constituting the tension applying member 73 and the coil spring 84 serving as the biasing member 74 are housed within the second housing portion 72 where the drive cable 32 to which the tensile force of the tension applying member 73 is applied is routed.

Specifically, each of the support members 81 and 82 includes a pair of side wall portions 86*a* and 86*b* facing each other, a base wall portion 87 connecting base end sides of the side wall portions 86*a* and 86*b*, and an axial portion 88 extending in a direction substantially orthogonal to the base wall portion 87. Each of the side wall portions 86*a* and 86*b* includes a U-shaped groove 85 at an end.

That is, the support members 81 and 82 rotatably support the pulleys 75 and 76 respectively in a state where rotation shafts 75*a* and 76*a* of the pulleys 75 and 76 are inserted to be positioned within the respective U-shaped grooves 85 so that each of the rotation shafts 75*a* and 76*a* is bridged between the side wall portions 86*a* and 86*b*. In addition, the coil springs 83 and 84 are fitted to the respective axial portions 88 of the support members 81 and 82. The support member 82 at the second tension applying apparatus 52 applying the tensile force to the second drive cable 32 includes a tubular portion 89 surrounding an outer side of the coil spring 84 which is fitted to the axial portion 88. In the embodiment, respective one ends (first ends) of the coil springs 83 and 84 fitted to the axial portions 88 make contact with the base wall portions 87 of the support members 81 and 82 so that the biasing forces generated by the coil springs 83 and 84 are transmitted to the support members 81, 82 and the pulleys 75, 76 supported at the support members 81, 82.

In the drum apparatus 40 of the embodiment, contact surfaces S are provided within the first housing portion 71 and the second housing portion 72 respectively, the first housing portion 71 and the second housing portion 72 being constituted by the housing 63 and the cover member 64 serving as housing members of the drum apparatus 40. The other ends (second ends) of the coil springs 83 and 84 make contact with the respective contact surfaces S. That is, the coil springs 83 and 84 are compressed between the respective contact surfaces S and the support members 81 and 82. Based on elastic resilience of each of the coil springs 83 and 84, the pulleys 75 and 76 supported at the support members 81 and 82 are biased to be pressed against the drive cables 31 and 32.

Specifically, as illustrated in FIGS. 5 to 7, in the embodiment, the contact surfaces S are arranged adjacent to the respective end portions 63*a* and 63*b* of the housing 63 to which ends 53*e* and 54*e* of the guide tubes 53 and 54 are connected. In addition, guide grooves 91 and 92 are provided at the cover member 64 constituting the first housing portion 71 and the second housing portion 72 in a state where the cover member 64 is mounted to the housing 63. The guide grooves 91 and 92 extend from the end portions 63*a* and 63*b* to a center (a right side in FIG. 6 and a left side in FIG. 7) along the W-shaped configuration of the housing 63. Guide grooves 93 and 94 are also provided at the bottom wall 63*c* of the housing 63 so as to be positioned facing the respective guide grooves 91 and 92 and in the vicinity of the cover member 64. The guide grooves 93 and 94 extend from the respective end portions 63*a* and 63*b* of the housing 63 towards the center thereof in the same way as the guide grooves 91 and 92.

In the present embodiment, the rotation shafts 75*a* and 76*a* of the pulleys 75 and 76 are inserted to be positioned within the guide grooves 91, 92 and the guide grooves 93, 94. The pulleys 75 and 76 are configured to be guided by the guide grooves 91, 92 and the guide grooves 93, 94 so as to move along an extending direction of each of the guide grooves 91, 92, 93 and 94.

Specifically, as illustrated in FIGS. 4 to 7, the pulleys 75 and 76 biased by the coil springs 83 and 84 are guided by the guide grooves 91, 92 and the guide grooves 93, 94 so as to move from the end portions 63*a* and 63*b* of the housing 63 towards the center thereof. The drive cables 31 and 32 one of which is reeled in to the drum 42 from one of the guide tubes 53 and 54 connected to the respective end portions 63*a* and 63*b* of the housing 63 while the other of which is reeled out towards the other of the guide tubes 53 and 54 from the drum 42 extend in a direction intersecting with the guide grooves 91, 92 and the guide grooves 93, 94. Accordingly, in the embodiment, the pulleys 75 and 76 constituting the tension applying members 73 are configured to be pressed against the drive cables 31 and 32 routed within the first housing portion 71 and the second housing portion 72 respectively.

For example, the pulley (75, 76) pressed against the drive cable (31, 32) which is reeled out from the drum 42 moves to the center based on the biasing force of the coil spring (83, 84). Then, the pulley (75, 76) pressed against the drive cable (31, 32) which is reeled in to the drum 42 moves towards the end portion (63*a*, 63*b*) of the housing 63 against the biasing force of the coil spring (83, 84).

Accordingly, the pulleys 75 and 76 biased by the coil springs 83 and 84 are guided by the guide grooves 91, 92 and the guide grooves 93, 94 so that the pulleys 75 and 76 move in a pressing direction and a separating direction (pressing and anti-pressing directions) relative to the drive cables 31 and 32 routed within the first housing portion 71 and the second housing portion 72. Accordingly, the tension applying apparatuses 51 and 52 of the embodiment are configured to apply appropriate tensile forces to the respective drive cables 31 and 32.

In the drum apparatus 40 of the embodiment, each of the tension applying apparatuses 51 and 52 includes a temporary holding structure so that the pulleys 75 and 76 and the support members 81 and 82 constituting the tension applying members 73 are retainable in a state where forces with which the tension applying members 73 are pressed against the drive cables 31 and 32 are weakened. In the embodiment, as a result, in a case where the drive cables 31 and 32 are connected to the slide door 4 (guide roller unit 21), an amount of looseness of each of the drive cables 31 and 32 increases to easily perform the connection operation of the drive cables 31 and 32.

(Temporary Holding Structure of the Tension Applying Member in the First Tension Applying Apparatus)

First, the temporary holding structure of the tension applying member 73 mounted to the first tension applying apparatus 51 which applies the tensile force to the first drive cable 31 is explained.

As illustrated in FIGS. 5, 6, 10 and 11, the first tension applying apparatus 51 of the embodiment includes a holding member 100 which includes a rotation shaft 100*a* substantially in parallel to the rotation shaft 42*a* of the drum 42 and which is housed within the first housing portion 71. The pulley 75 and the support member 81 constituting the tension applying member 73 of the first tension applying apparatus 51 and the coil spring 83 serving as the biasing member 74 are retained by the holding member 100.

Specifically, the holding member 100 of the embodiment includes an angular tube portion 101 which includes an opening end (a right end portion in FIGS. 6 and 11) and an elongated configuration in a substantially angular tube form. The pulley 75, the support member 81 and the coil spring 83 are retained within the tube of the angular tube portion 101.

Figure 11:
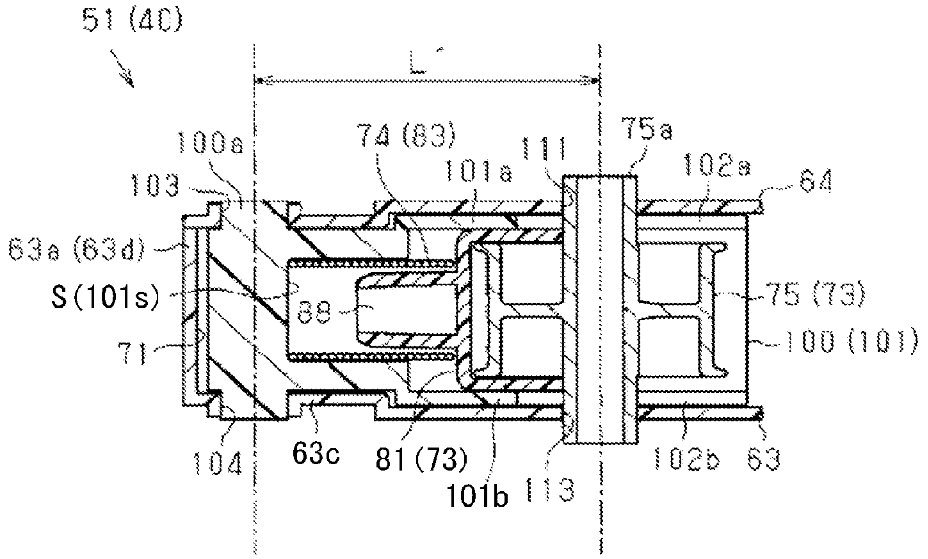
FIG. 11 is a cross-sectional view of the first tension applying apparatus in the temporary holding state, the cross-sectional view being taken along a line XI-XI in FIG. 9.

Specifically, as illustrated in FIGS. 6 and 11, the coil spring 83 is inserted to be positioned within the angular tube portion 101 so that a bottom surface 101*s* of the angular tube portion 101 serves as the contact surface S. In addition, the angular tube portion 101 includes opposed side wall portions 101*a* and 101*b* each of which is cut from an opening end side to a base end side of the angular tube portion 101 (from the right side to the left side in FIGS. 6 and 11) to obtain a pair of slits 102*a* and 102*b* extending in a longitudinal direction of the angular tube portion 101. The pulley 75 and the support member 81 are also inserted to be positioned within the angular tube portion 101 in a state where the rotation shaft 75*a* of the pulley 75 is inserted to be positioned within both the slits 102*a* and 102*b*.

In the embodiment, the rotation shaft 100*a* of the holding member 100 is arranged at the base end side of the angular tube portion 101. In addition, a support bore 103 is provided at the cover member 64 and a support bore 104 is provided at the bottom wall 63*c* of the housing 63, the cover member 64 and the housing 63 constituting the first housing portion 71. In the embodiment, the support bores 103 and 104 are provided adjacent to positions where the end 53*e* of the guide tube 53 is connected to the end portion 63*a* of the housing 63. Accordingly, the holding member 100 of the embodiment is rotatable about the rotation shaft 100*a* which is supported at the bottom wall 63*c* of the housing 63 and the cover member 64 on the same plane as the first drive cable 31 which is also arranged within the first housing portion 71 in the same way as the holding member 100.

That is, in the holding member 100 of the embodiment, the angular tube portion 101 functions as a guide portion so as to specify a moving direction of each of the pulley 75 and the support member 81 held within the tube of the angular tube portion 101, specifically, to restrict the moving direction to a longitudinal direction of the holding member 100. In addition, the holding member 100 rotates about the rotation shaft 100*a* so that the moving direction of each of the pulley 75 and the support member 81 guided by the angular tube portion 101 is changeable. In the first tension applying apparatus 51 of the embodiment, the holding member 100 is rotated so that the pulley 75 and the support member 81 may be temporarily held in a state where the force with which the pulley 75 is pressed against the first drive cable 31 is weakened.

Figure 9:
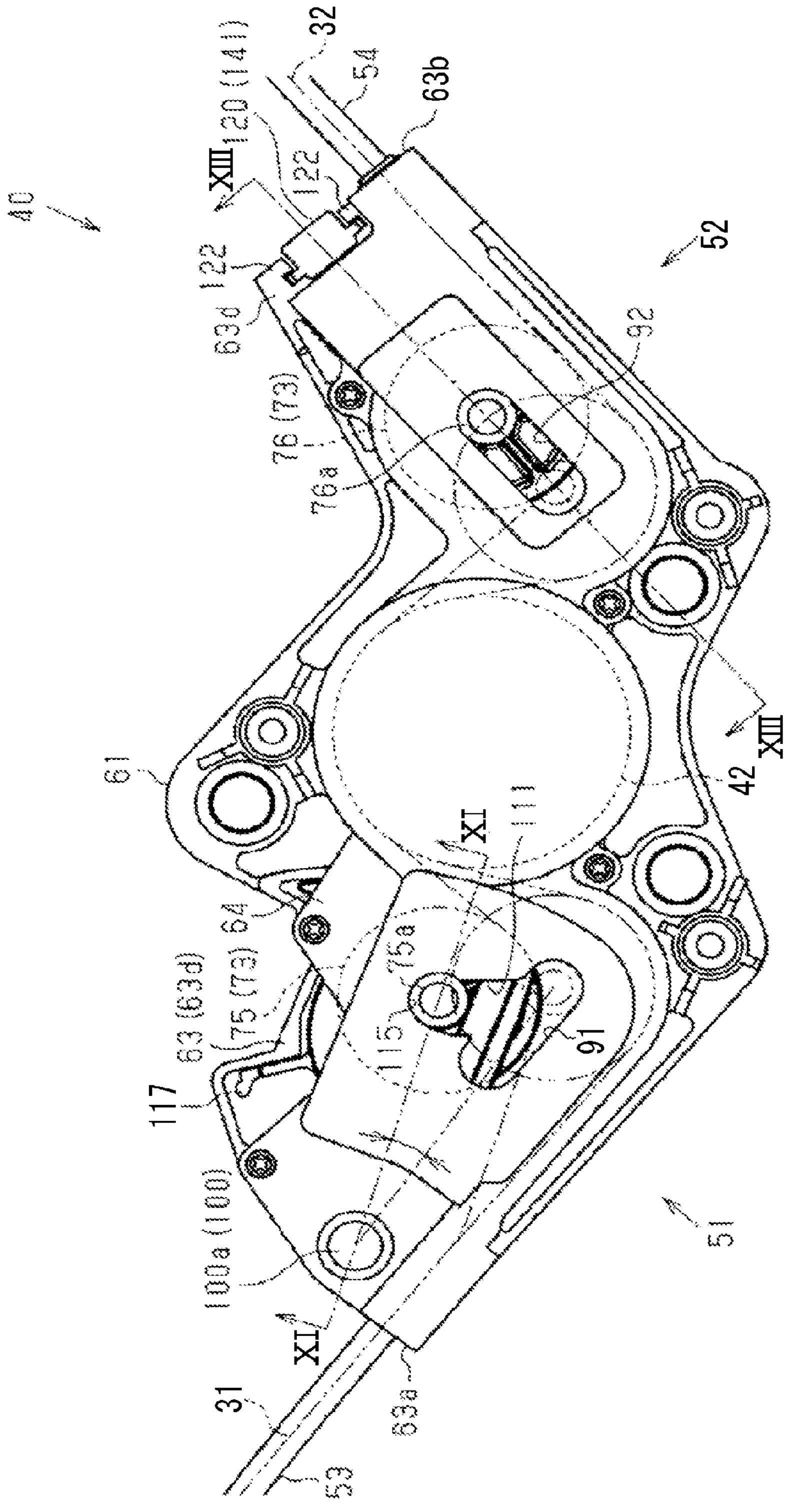
FIG. 9 is a side view illustrating the drum apparatus with the cover member in the temporary holding state and the tension applying apparatuses provided at the drum apparatus.
Figure 10:
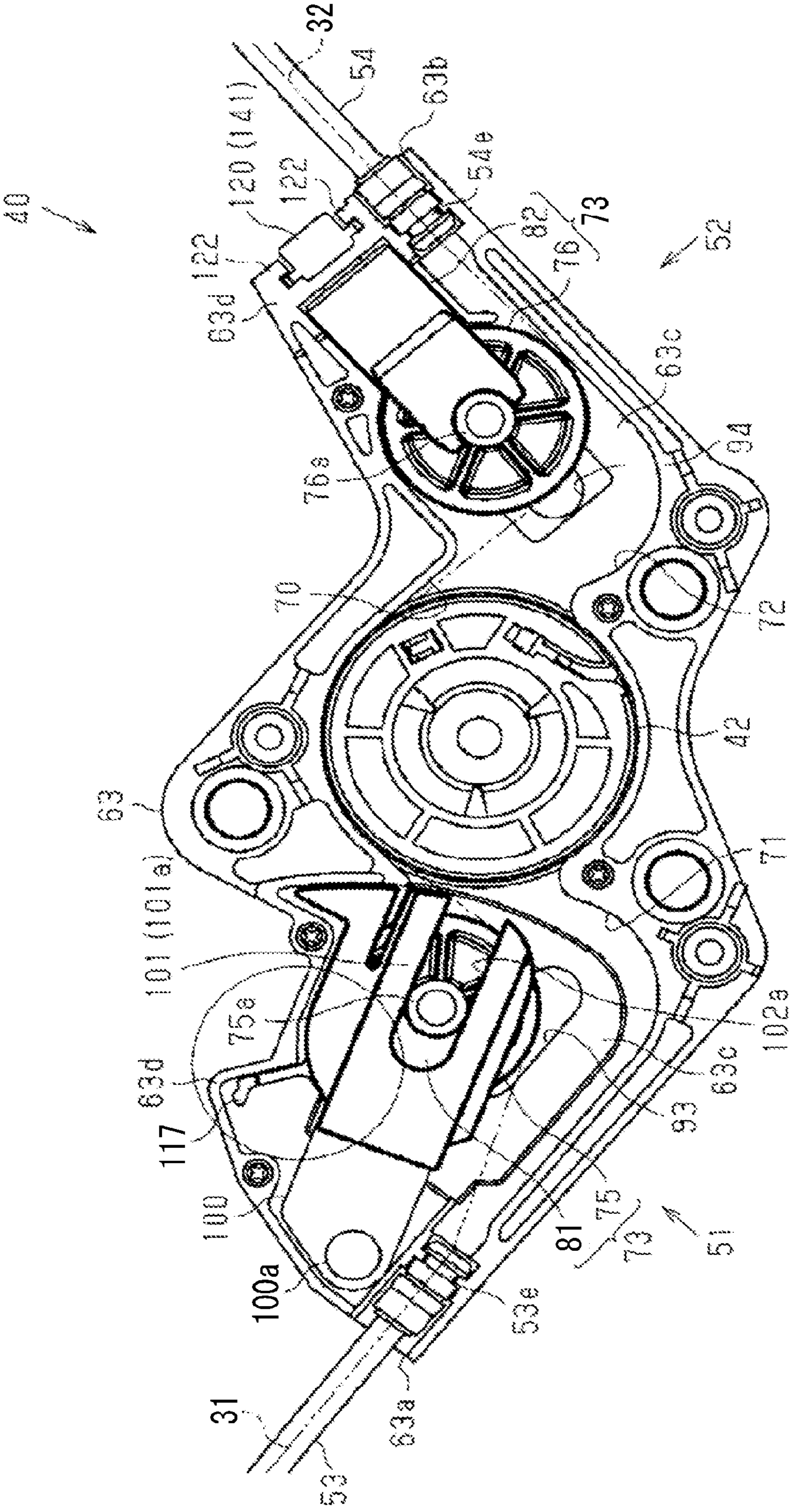
FIG. 10 is a side view illustrating the drum apparatus without the cover member in the temporary holding state and the tension applying apparatuses provided at the drum apparatus.

Specifically, as illustrated in FIGS. 9 and 10, the holding member 100 of the embodiment rotates in a counterclockwise direction in FIGS. 9 and 10 so that an angle (pressing angle) by which the pulley 75 guided by the angular tube portion 101 that constitutes the guide portion of the holding member 100 is pressed against the first drive cable 31 routed within the first housing portion 71 based on the biasing force of the coil spring 83 is formed to be shallow.

That is, a path of the first drive cable 31 reeled out from the drum 42 and reeled in to the drum 42 is bent greatly while the pressing angle of the pulley 75 relative to the first drive cable 31 is deeper. In addition, the path of the first drive cable 31 becomes linear while the pressing angle of the pulley 75 relative to the first drive cable 31 is shallower. Accordingly, the force with which the pulley 75 is pressed against the first drive cable 31 is strong while the pressing angle that changes depending on a rotation position of the holding member 100 is deeper and is weak while the pressing angle is shallower. In the first tension applying apparatus 51 of the embodiment, the holding member 100 may be held at the rotation position to which the holding member 100 rotates in a direction where the pressing angle of the pulley 75 becomes shallow.

Specifically, as illustrated in FIGS. 9 to 11, second guide grooves 111 and 113 are provided at the cover member 64 and the bottom wall 63*c* of the housing 63 respectively, the cover member 64 and the housing 63 constituting the first housing portion 71, so as to extend by intersecting with the first guide grooves 91 and 93. In the embodiment, the second guide grooves 111 and 113 serve as bore portions into which the rotation shaft 75*a* of the pulley 75 is also insertable.

That is, in the first tension applying apparatus 51, the pulley 75 moves in a direction separating from the first drive cable 31 against the biasing force of the coil spring 83 so that the rotation shaft 75*a* which is inserted to be positioned within the first guide grooves 91 and 93 is movable from the first guide grooves 91 and 93 to the second guide grooves 111 and 113. Then, in the first tension applying apparatus 51 of the embodiment, the pulley 75 and the support member 81 move in an extending direction of each of the second guide grooves 111 and 113 while being guided by the second guide grooves 111 and 113 to thereby permit the rotation of the holding member 100.

In addition, the holding member 100 rotates in a direction where the rotation shaft 75*a* of the pulley 75 guided by the second guide grooves 111 and 113 is separated from the first guide grooves 91 and 93 (counterclockwise direction in FIG. 9) so that the pressing angle of the pulley 75 relative to the first drive cable 31 becomes shallow. According to the first tension applying apparatus 51 of the embodiment, the pulley 75 and the support member 81 may be retained at a position where the force with which the pulley 75 is pressed against the first cable 31 is weakened.

Further, in the embodiment, each of the second guide grooves 111 and 113 includes a configuration so that the biasing force may be stored at the coil spring 83 held at the holding member 100 in a state where the pulley 75 guided by the second guide grooves 111 and 113 moves in a direction separating from the first guide grooves 91 and 93 with the rotation of the holding member 100.

Specifically, the second guide grooves 111 and 113 are configured so that a center-to center dimension between the rotation shaft 75*a* of the pulley 75 and the rotation shaft 100*a* of the holding member 100 (L, L') decreases (L>L') in a state where the pulley 75 moves in the direction separating from the first guide grooves 91 and 93. Refer to FIGS. 6 and 11. In the embodiment, as a result, the coil spring 83 is compressed between the support member 81 for the pulley 75 and the contact surface S provided at the holding member 100.

As illustrated in FIGS. 4 and 9, in the embodiment, an engagement portion 115 is provided at a position in each of the second guide grooves 111 and 113 most away from the first guide grooves 91 and 93, i.e., at the rotation position of the holding member 100 in FIG. 11. The engagement portion 115 is engageable with the rotation shaft 75*a* of the pulley 75 which is guided by the second guide grooves 111 and 113. Specifically, the engagement portion 115 is provided by bending the extending direction of each of the second guide grooves 111 and 113. In the embodiment, as a result, the rotation shaft 75*a* of the pulley 75 is engaged at the position most away from the first guide grooves 91 and 93 based on the stored biasing force of the coil spring 83.

Further, the first tension applying apparatus 51 of the embodiment includes a rotation restriction member 117 which may restrict the rotation of the holding member 100 at a rotation position where the rotation shaft 75*a* of the pulley 75 is inserted to be positioned within the first guide grooves 91 and 93, i.e., at a rotation position illustrated in FIGS. 4 to 6.

Figure 12A:
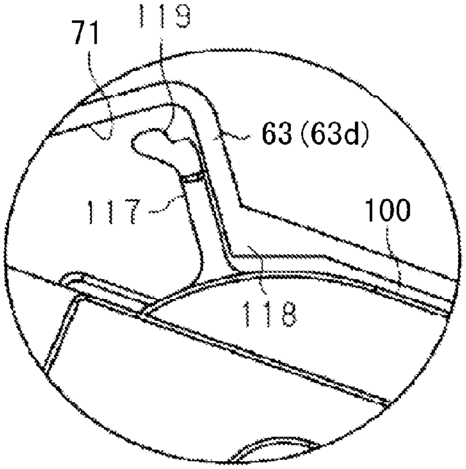
FIGS. 12A and 12B are enlarged views each of which illustrates a vicinity of a rotation restriction member, FIG. 12A illustrating the temporary holding state, FIG. 12B illustrating a state after the connection operation of the drive cables.
Figure 12B:
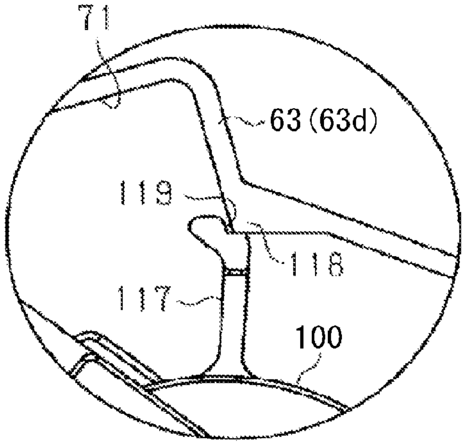

Specifically, as illustrated in FIGS. 12A and 12B, the rotation restriction member 117 of the embodiment is integrally provided at the holding member 100 in a state where a tip end side of the rotation restriction member 117 protrudes towards a peripheral wall 63*d* of the housing 63. In addition, in the embodiment, an engagement protruding portion 118 is provided at the peripheral wall 63*d* of the housing 63 so as to protrude to an inner side of the first housing portion 71. An engagement recess portion 119 is provided at a tip end portion of the rotation restriction member 117 so as to be engageable with the engagement protruding portion 118.

That is, the rotation restriction member 117 of the embodiment rotates integrally with the holding member 100 so that the engagement recess portion 119 is configured to engage with the engagement protruding portion 118 provided at the peripheral wall 63*d* of the housing 63 at the rotation position of the holding member 100 at which the rotation shaft 75*a* of the pulley 75 is guided by the first guide grooves 91 and 93. Refer to FIGS. 4 and 5. Accordingly, by the restriction of the rotation of the holding member 100, the first tension applying apparatus 51 of the embodiment is configured so that the pulley 75 guided by the first guide grooves 91 and 93 is stably movable in the pressing direction and the separating direction relative to the first drive cable 31.

(Temporary Holding Structure of the Tension Applying Member in the Second Tension Applying Apparatus)

Next, the temporary holding structure of the tension applying member 73 mounted to the second tension applying apparatus 52 which applies the tensile force to the second drive cable 32 is explained.

As illustrated in FIGS. 5, 7, 10 and 13, in the second tension applying apparatus 52, the pulley 76 and the support member 82 housed within the second housing portion 72 are also guided by the guide grooves 92 and 94 provided at the cover member 64 and the bottom wall 63*c* of the housing 63. Accordingly, the pulley 76 is movable in the pressing direction and the separating direction relative to the second drive cable 32. The second tension applying apparatus 52 includes an engagement member 120 which may cause the pulley 76 and the support member 82 to engage with the housing 63 at a position to which the pulley 76 and the support member 82 constituting the tension applying member 73 move in a direction separating from the second drive cable 32, i.e., a position at which the biasing force of the coil spring 84 serving as the biasing member 74 is stored at the coil spring 84.

That is, the pulley 76 and the support member 82 engage with the housing 63 so that the biasing force stored at the coil spring 84 is inhibited from being transmitted to the second drive cable 32. In the embodiment, as a result, the pulley 76 and the support member 82 may be held in a state where a force with which the pulley 76 is pressed against the second drive cable 32 is weakened.

Specifically, as illustrated in FIGS. 7, 13, 14A and 14B, a penetration bore 121 is provided at the peripheral wall 63*d* of the housing 63 which is positioned at the end portion 63*b* of the second housing portion 72 connected to an end 54*e* of the guide tube 54. The axial portion 88 of the support member 82 is inserted to the penetration bore 121 in a case where the support member 82 moves in a direction separating from the second drive cable 32. In addition, the engagement member 120 of the embodiment is provided at an outer peripheral surface 63*s* of the housing 63 at a position where the penetration bore 121 is provided. The engagement member 120 engages, via the penetration bore 121, with the axial portion 88 of the support member 82 protruding towards the outer peripheral surface 63*s* of the housing 63 so that the support member 82 and the pulley 76 are engageable with the housing 63.

Further specifically, as illustrated in FIGS. 14A, 14B, 15A and 15B, the engagement member 120 of the embodiment includes an outer configuration in a substantially rectangular flat plate. In addition, in the embodiment, a pair of guide flanges 122 is provided at the outer peripheral surface 63*s* of the housing 63 for slidably holding the engagement member 120 by sandwiching the engagement member 120 with the outer peripheral surface 63*s*. Specifically, the guide flanges 122 sandwich the engagement member 120 in a short-length direction thereof (in a left-right direction in FIG. 15A) for holding the engagement member 120 at a position at which the penetration bore 121 is provided. Accordingly, the engagement member 120 of the embodiment is slidable on the outer peripheral surface 63*s* of the housing 63 along a longitudinal direction of the engagement member 120 in a state where the longitudinal direction (up-down direction in FIG. 15A) substantially matches the axial direction of the pulley 76 (extending direction of the rotation shaft 76*a*).

In the embodiment, operation flanges 141 and 142 are provided at longitudinally opposed ends of the engagement member 120 so as to protrude in a thickness direction (up-down direction in FIG. 15B) of the engagement member 120. Further, an insertion bore 130 is provided at the engagement member 120 so as to penetrate the engagement member 120 in the thickness direction thereof. The axial portion 88 of the support member 82 protruding towards the outer peripheral surface 63*s* of the housing 63 via the penetration bore 121 is inserted to be positioned within the insertion bore 130.

Specifically, the insertion bore 130 includes first and second bore portions 131 and 132 which are continued in the longitudinal direction of the engagement member 120. The first bore portion 131 includes a configuration for allowing insertion and removal of the axial portion 88 in a direction where the support member 82 biased by the coil spring 84 moves, i.e., in the thickness direction of the engagement member 120. The second bore portion 132 includes a configuration for restricting removal of the axial portion 88 in the direction where the support member 82 biased by the coil spring 84 moves in a state where the second bore portion 132 engages with the axial portion 88 which is inserted to the second bore portion 132.

Figure 15A:
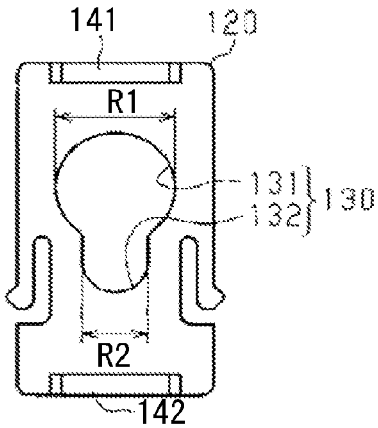
FIGS. 15A and 15B are a front view of an engagement member and a plan view of the engagement member, respectively.
Figure 15B:
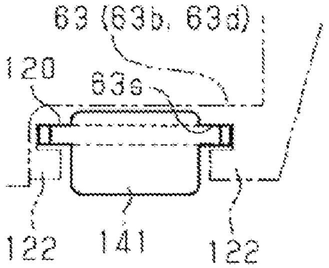
Figure 16:
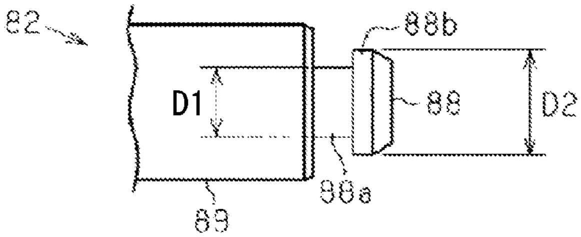
FIG. 16 is a side view of an axial portion provided at a support member.

Specifically, as illustrated in FIG. 16, the axial portion 88 constituting an engagement protruding portion in the support member 82 of the embodiment includes a small diameter portion 88*a* in a substantially column form and a flange portion 88*b* provided at an end of the small diameter portion 88*a*. In addition, as illustrated in FIG. 15A, the first and second bore portions 131 and 132 include circular bore configurations which partially overlap in the longitudinal direction of the engagement member 120. In the embodiment, an inner diameter R1 of the first bore portion 131 is set to be a greater value than a diameter D2 of the flange portion 88*b* of the axial portion 88 (R1>D2). An inner diameter R2 of the second bore portion 132 is specified to be a value greater than a diameter D1 of the small diameter portion 88*a* of the axial portion 88 and smaller than the diameter D2 of the flange portion 88*b* (D1<R2<D2).

That is, the engagement member 120 of the embodiment slides in the longitudinal direction thereof by operations of the operation flanges 141 and 142. Accordingly, any one of the first bore portion 131 and the second bore portion 132 constituting the insertion bore 130 is arranged at a position corresponding to the penetration bore 121.

The insertion bore 130 of the embodiment is configured so that the axial portion 88 of the support member 82 inserted to be positioned within the insertion bore 130 relatively moves between the first and second bore portions 131 and 132 by the aforementioned operation of the engagement member 120. As a result, in the second tension applying apparatus 52 of the embodiment, the pulley 76 and the support member 82 may be engaged at positions where the biasing force of the coil spring 84 is stored at the coil spring 84 and such engagement may be released.

Figure 17A:
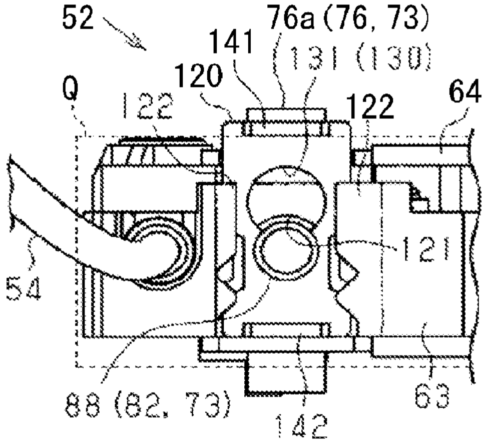
FIGS. 17A and 17B are operation explanatory views of the second tension applying apparatus, FIG. 17A illustrating the temporary holding state, FIG. 17B illustrating a state after the connection operation of the drive cables.
Figure 17B:
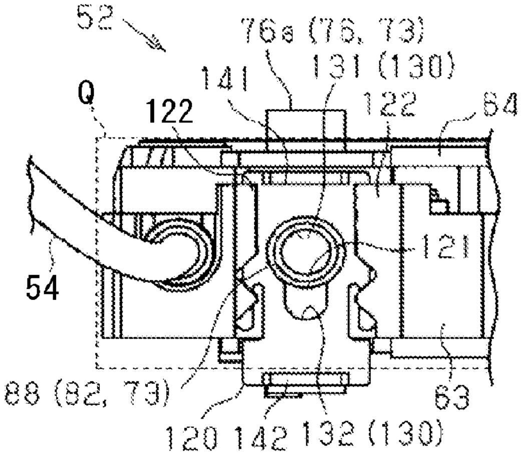

Specifically, as illustrated in FIGS. 17A and 17B, the engagement member 120 of the embodiment is configured so that any one of longitudinally end portions of the engagement member 120 protrudes from an outline Q obtained by the housing 63 and the cover member 64 in a side view viewed from the outer peripheral surface 63*s* of the housing 63 at which the engagement member 120 is retained. That is, one of the operation flanges 141 and 142 provided at the longitudinally opposed ends is retracted into the outline Q constituted by the housing 63 and the cover member 64 so that the other of the operation flanges 141 and 142 protrudes from the outline Q of the housing 63 and the cover member 64 in a direction where the one of the operation flanges 141 and 142 is retracted. Accordingly, the engagement member 120 is configured so that the operation flange 141 or 142 which protrudes is operated in a direction being retracted into the outline Q of the housing 63 and the cover member 64.

Figure 13:
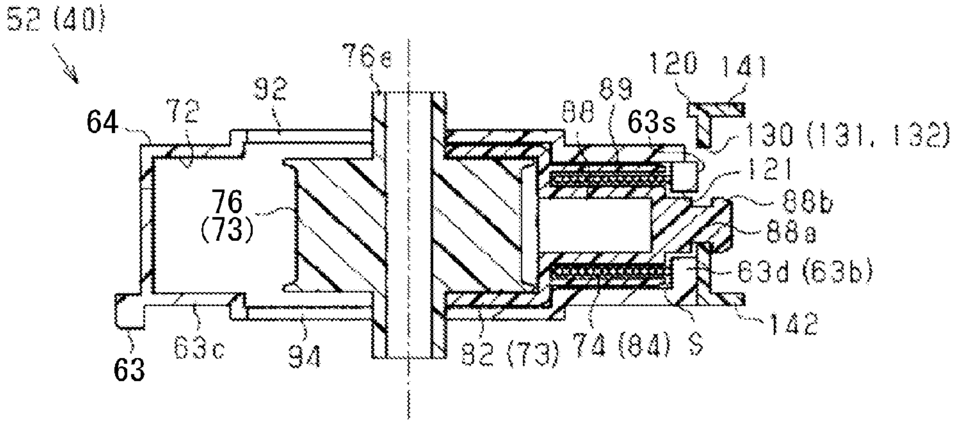
FIG. 13 is a cross-sectional view of the second tension applying apparatus in the temporary holding state, the cross-sectional view being taken along a line XIII-XIII in FIG. 9.
Figure 14A:
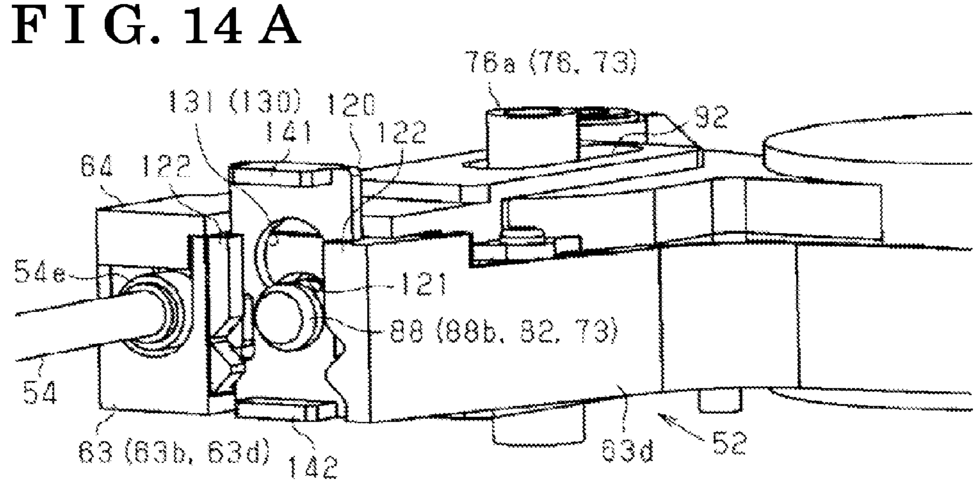
FIGS. 14A and 14B are perspective views each of which illustrates the second tension applying apparatus, FIG. 14A illustrating the temporary holding state, FIG. 14B illustrating a state after the connection operation of the drive cables.
Figure 14B:
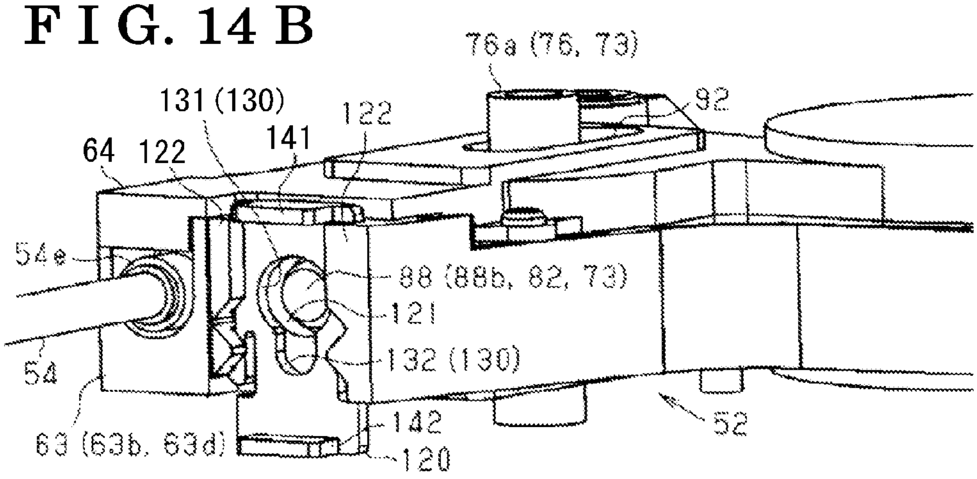

Specifically, as illustrated in FIGS. 13, 14A and 17A, in a case where the operation flange 141 serving as a first operation portion protrudes at the side of the cover member 64 (upper side in FIGS. 13 and 17A), the engagement member 120 of the embodiment is configured so that the second bore portion 132 thereof is disposed at a position corresponding to the penetration bore 121. Then, as illustrated in FIGS. 7, 14B and 17B, in a case where the operation flange 142 serving as a second operation portion protrudes at the side of the bottom wall 63*c* of the housing 63 (lower side in FIGS. 7 and 17B), the engagement member

120 of the embodiment is configured so that the first bore portion 131 thereof is disposed at a position corresponding to the penetration bore 121.

That is, in the second tension applying apparatus 52 of the embodiment, the axial portion 88 of the support member 82 is in a state being insertable into the first bore portion 131 of the insertion bore 130 by the pressing of the operation flange 141 serving as the first operation portion to operate the engagement member 120 in the direction where the operation flange 141 is retracted into the outline Q of the housing 63 and the cover member 64. Accordingly, the support member 82 and the pulley 76 are movable to positions at which the biasing force is stored at the coil spring 84.

Further, the operation flange 142 serving as the second operation portion is pressed from the aforementioned state to move the engagement member 120 in the direction where the operation flange 142 is retracted into the outline Q of the housing 63 and the cover member 64 so that the axial portion 88 of the support member 82 which is inserted to be positioned within the insertion bore 130 relatively moves from the first bore portion 131 to the second bore portion 132. As a result, because of the engagement of the axial portion 88 with the second bore portion 132, removal of the axial portion 88 in a direction where the support member 82 biased by the coil spring 84 moves, i.e., in the axial direction of the axial portion 88, is restricted. In the embodiment, the support member 82 and the pulley 76 therefore engage with the housing 63 at the positions at which the biasing force is stored at the coil spring 84.

In a case where each of the support member 82 and the pulley 76 engages with the housing 63, such engagement of each of the support member 82 and the pulley 76 is released by pressing the operation flange 141 to operate the engagement member 120 in the direction where the operation flange 141 is retracted into the outline Q of the housing 63 and the cover member 64. Accordingly, in the second tension applying apparatus 52 of the embodiment, each of the support member 82 and the pulley 76 biased by the coil spring 84 is configured to move in a direction pressed against the second drive cable 32.

Next, an assembly procedure (operation) of the drum apparatus 40 constructed in the aforementioned manner is explained. As illustrated in FIGS. 9, 10 and 13, upon assembly of the drum apparatus 10 on the vehicle 1 (vehicle body 2), in each of the tension applying apparatuses 51 and 52 provided at the drum apparatus 40 of the embodiment, the tension applying member 73 is retained in a state where a force with which the tension applying member 73 is pressed against the drive cable 31 or 32 is weakened on a basis of the biasing force of the biasing member 74.

That is, at this time, in the first tension applying apparatus 51, the rotation shaft 75*a* of the pulley 75 constituting the tension applying member 73 is in a state being inserted to be positioned within the second guide grooves 111 and 113 which extend to intersect with the first guide grooves 91 and 93, i.e., in a state engaging with the second guide grooves 111 and 113. In the second tension applying apparatus 52, the support member 82 of the pulley 76 constituting the tension applying member 73, specifically, the axial portion 88 of the support member 82, engages with the housing 63 serving as the housing member by the engagement member 120. As a result, the forces with which the pulleys 75 and 76 are pressed against the respective drive cables 31 and 32 are weakened and the biasing forces are stored at the coil springs 83 and 84 serving as the biasing members 74.

In the embodiment, the connection operation of each of the drive cables 31 and 32 to the slide door 4 (guide roller unit 21) is performed while each of the tension applying members 73 of the tension applying apparatuses 51 and 52 is in the temporary holding state. After the connection operation, the biasing force stored at each of the coil springs 83 and 84 is released so that the appropriate tensile force is applied to each of the drive cables 31 and 32 against which the pulleys 75 and 76 are pressed.

Specifically, in the first tension applying apparatus 51, the rotation shaft 75*a* of the pulley 75 protruding from the cover member 64 (the bottom wall 63*c* of the housing 63) by being inserted to be positioned within the second guide groove 111 (113) is operated so that the rotation shaft 75*a* moves from the second guide grooves 111 and 113 to the first guide grooves 91 and 93. Because the holding member 100 rotates, the pressing angle of the pulley 75 relative to the first drive cable 31 is deepened. Further, in the aforementioned state, the rotation restriction member 117 restricts the rotation of the holding member 100. The first tension applying apparatus 51 of the embodiment is therefore configured so that each of the pulley 75 and the support member 81 biased by the coil spring 83 is movable in the pressing direction and the separating direction relative to the first drive cable 31 while being guided by the first guide grooves 91 and 93.

In addition, in the second tension applying apparatus 52, the operation flange 141 serving as the operation portion is pressed to operate the engagement member 120 in the direction where the operation flange 141 is retracted into the outline Q of the housing 63 and the cover member 64. Then, in the second tension applying apparatus 52 of the embodiment, the engagement of the support member 82 by the engagement member 120 is released. Accordingly, each of the pulley 76 and the support member 82 biased by the coil spring 84 is configured to be movable in the pressing direction and the separating direction relative to the second drive cable 32 in a state being guided by the guide grooves 92 and 94.

According to the embodiment, the following effects are obtainable.

(1) The first tension applying apparatus 51 includes the holding member 100 including the guide portion which restricts the moving direction of the tension applying member 73 biased by the biasing member 74. The first tension applying apparatus 51 also includes the housing 63 and the cover member 64 serving as the housing members that house therein the tension applying member 73 and the holding member 100. In addition, the holding member 100 is housed within the first housing portion 71 while including the rotation shaft 100*a* so that the holding member 100 is configured to change the moving direction of the tension applying member 73 which is guided by the guide portion. Further, the temporary holding structure which may hold the holding member 100 at the position to which the holding member 100 rotates in the direction in which the pressing angle of the tension applying member 73 against the first drive cable 31 becomes shallow is provided at the housing 63 and the cover member 64.

That is, the deeper the pressing angle which changes on a basis of the rotation of the holding member 100 is, the stronger the force with which the tension applying member 73 is pressed against the first drive cable 31 is. The shallower the pressing angle is, the weaker the force with which the tension applying member 73 is pressed against the first drive cable 31 is. Thus, according to the aforementioned construction, without increasing the stroke amount of the tension applying member 73 in the direction where the tension applying member 73 is pressed against the first drive cable 31 based on the biasing force of the biasing member 74 and in the direction where the tension applying member 73 separates from the first drive cable 31 against the aforementioned biasing force, the pressing force is weakened to secure a large amount of looseness. As a result, without disturbing appropriate tension application and downsizing of the apparatus, the connection operation of the first drive cable 31 may be simplified. In addition, there is an advantage that, in a case where the holding member 100 is rotated for releasing the temporary holding state, the biasing member 74 is inhibited from serving as a resistance. An improved operability may be secured accordingly.

(2) The second tension applying apparatus 52 includes the engagement member 120 which may cause the tension applying member 73 to engage with the housing 63 serving as the housing member at the position at which the biasing force is stored at the biasing member 74. The engagement member 120 includes the operation flange 141 serving as the operation portion protruding from the outline Q of the housing 63 and the cover member 64. The engagement member 120 is configured to release the engagement of the tension applying member 73 by the operation of the operation flange 141 in the direction where the operation flange 141 is retracted into the outline Q of the housing 63 and the cover member 64.

According to the aforementioned construction, even in a case where a protruding amount of the operation flange 141 protruding from the outline Q of the housing 63 and the cover member 64 is restrained, the engagement member 120 may be operated easily and securely. As a result, the improved operability may be secured.

(3) In the tension applying apparatus 51, the tension applying member 73 includes the pulley 75 pressed against the drive cable 31 and the support member 81 rotatably supporting the pulley 75. In the tension applying apparatus 52, the tension applying member 73 includes the pulley 76 pressed against the drive cable 32 and the support member 82 rotatably supporting the pulley 76. Accordingly, without disturbing the operations of the drive cables 31 and 32, the tensile force is applicable to each of the drive cables 31 and 32 against which the tension applying member 73 is pressed.

(4) The first guide grooves 91 and 93 are provided at the housing 63 and the cover member 64 serving as the housing members for guiding the tension applying member 73 biased by the biasing member 74 in the pressing direction and the separating direction relative to the first drive cable 31. The second guide grooves 111 and 113 are also provided at the housing 63 and the cover member 64 for allowing the operation of the holding member 100 in a state extending to intersect with the first guide grooves 91 and 93.

According to the aforementioned construction, the tension applying member 73 is brought to a state being guided by the guide grooves 111 and 113 so that the holding member 100 stably rotates. The tension applying member 73 rotates the holding member 100 in the direction separating from the first guide grooves 91 and 93 so that the pressing angle of the tension applying member 73 relative to the first drive cable 31 becomes shallow. From the aforementioned state, the holding member 100 is rotated in an opposite direction so that the tension applying member 73 returns to the state being guided by the first guide grooves 91 and 93. As a result, the appropriate tensile force is applicable to the first drive cable 31 against which the tension applying member 73 is pressed.

(5) Each of the second guide grooves 111 and 113 includes the configuration so that the biasing force may be stored at the coil spring 83 held at the holding member 100 in a state where the tension applying member 73 guided by the second guide grooves 111 and 113 moves in the direction separating from the first guide grooves 91 and 93 with the rotation of the holding member 100.

According to the aforementioned construction, in a case where the temporary holding state is released, the holding member 100 is rotatable with the biasing force stored at the biasing member 74. As a result, the improved operability may be secured.

(6) The engagement portion 115 is provided at each of the second guide grooves 111 and 113 so as to engage the tension applying member 73 with each of the second guide grooves 111 and 113 at the rotation position of the holding member 100 where the pressing angle of the tension applying member 73 is shallow. Accordingly, the holding member 100 may be stably retained at the rotation position at which the pressing angle of the tension applying member 73 is shallow.

(7) The first tension applying apparatus 51 includes the rotation restriction member 117 which may restrict the rotation of the holding member 100 at the rotation position at which the tension applying member 73 is guided by the first guide grooves 91 and 93. As a result, the tension applying member 73 guided by the first guide grooves 91 and 93 may maintain the state stably moving in the pressing direction and the separating direction relative to the first drive cable 31.

(8) The coil spring 83 which generates the biasing force depending on its elastic deformation while being compressed between the contact surface S of the first housing portion 71 and the support member 81 and the coil spring 84 which generates the biasing force depending on its elastic deformation while being compressed between the contact surface S of the second housing portion 72 and the support member 82 are employed as the biasing members 74.

According to the aforementioned construction, the tension applying members 73 may be stably and securely pressed against the drive cables 31 and 32. As a result, there is an advantage that each of the biasing members 74 may be arranged in a compact manner.

(9) The contact surface S for the coil spring 83 is provided at the holding member 100. Because of such construction, regardless of the rotation position of the holding member 100, the coil spring 83 may maintain the state being compressed in the axial direction. As a result, the appropriate tensile force is applicable to the first drive cable 31 against which the tension applying member 73 that is biased by the coil spring 83 is pressed.

(10) The first tension applying apparatus 51 is configured so that the rotation shaft 75*a* of the pulley 75 inserted to be positioned within the first guide grooves 91, 93 or the second guide grooves 111, 113 protrudes to the outside of the housing 63 and the cover member 64 serving as the housing members. Because of such construction, the operation of the rotation shaft 75*a* of the pulley 75 protruding to the outside of the housing 63 and the cover member 64 may easily bring the holding member 100 to rotate.

(11) The engagement member 120 includes the operation flange 142 serving as the second operation portion protruding from the outline Q of the housing 63 and the cover member 64 in the direction where the operation flange 141 serving as the first operation portion is retracted into the outline Q. Then, the operation of the operation flange 142 in the direction being retracted into the outline Q of the housing 63 and the cover member 64 configures the tension applying member 73 to be engageable with the housing 63 at the position where the biasing force is stored.

According to the aforementioned construction, by a simple operation that is intuitively understandable, the engagement operation of the tension applying member 73 with the housing 63 may be performed. As a result, the improved operability may be secured.

(12) The engagement member 120 is configured so that while one of the operation flanges 141 and 142 is retracted into the outline Q of the housing 63 and the cover member 64, the other of the operation flanges 141 and 142 protrudes from the outline Q of the housing 63 and the cover member 64 in the aforementioned retracted direction.

According to the aforementioned construction, at the same time as the engagement operation of the tension applying member 73 with the housing 63 is completed, a preparation operation necessary for releasing the aforementioned engagement state is completed. As a result, with the simple construction, the improved operability may be secured.

(13) The insertion bore 130 including the first and second bore portions 131 and 132 which are continued in the operation direction of the engagement member 120 is provided at the engagement member 120. In addition, the axial portion 88 serving as the engagement protruding portion inserted to be positioned within the insertion bore 130 of the engagement member 120 at the position at which the support member 82 engages with the housing 63 is provided at the support member 82 constituting, together with the pulley 76, the tension applying member 73. Further, the first bore portion 131 includes the configuration which allows the insertion and removal of the axial portion 88 in the direction where the support member 82 biased by the coil spring 84 moves. The second bore portion 132 includes the configuration which may restrict the removal of the axial portion 88 in the moving direction of the support member 82 that is biased by the coil spring 84, based on the engagement with the axial portion 88. The insertion bore 130 is configured so that the axial portion 88 inserted to be positioned within the insertion bore 130 relatively moves between the first and second bore portions 131 and 132 by the operation of the engagement member 120.

According to the aforementioned construction, with the simple construction, the engagement member 120 may be provided in a manner that the operation flange 142 serving as the second operation portion is operated in the retracted direction so that the tension applying member 73 is engageable with the housing 63, and the operation flange 141 serving as the first operation portion is operated in the retracted direction so that the engagement of the tension applying member 73 is releasable.

(14) The peripheral wall 63*d* of the housing 63 is configured to serve as a wall portion including the penetration bore 121 into which the axial portion 88 provided at the support member 82 is inserted to be positioned, at the position where the biasing force is stored at the coil spring 84. The engagement member 120 slides on a wall surface of the wall portion facing an opposite side of the tension applying member 73, i.e., slides upon the outer peripheral surface 63*s* of the housing 63, so as to be configured engageable with the axial portion 88 inserted to be positioned within the penetration bore 121.

According to the aforementioned construction, with the simple construction, the tension applying member 73 may securely engage with the housing 63 and such engagement may be securely disengaged by the engagement member 120. The aforementioned embodiment may be modified as follows.

In the embodiment, the drum apparatus 40 includes the first and second tension applying apparatuses 51 and 52 including different temporary holding structures of the tension applying members 73 from each other. Then, it is configured that the first tension applying apparatus 51 applies the tensile force to the first drive cable 31 and the second tension applying apparatus 52 applies the tensile force to the second drive cable 32. However, not limited thereto, the tension applying apparatus 51 including the holding member 100 that is rotatable may be configured to apply the tensile force to each of the first and second drive cables 31 and 32 or the tension applying apparatus 52 including the engagement member 120 relative to the housing 63 may be configured to apply the tensile force to each of the first and second drive cables 31 and 32.

The tension applying apparatuses 51 and 52 are not necessarily provided integrally with the drum apparatus 40. In addition, each of the tension applying apparatuses 51 and 52 may apply the tensile force to the drive cable employed at the opening and closing body drive apparatus other than the slide door apparatus 30.

In the aforementioned embodiment, the coil springs (compression coil springs) 83 and 84 are employed for the biasing members 74. However, not limited thereto, the other spring member such as a torsion coil spring or a disc spring, for example, or a biasing member other than the spring member may be employed.

In the aforementioned embodiment, one of the tension applying members 73 includes the pulley 75 pressed against the drive cable 31 and the support member 81 rotatably supporting the pulley 75 while the other of the tension applying members 73 includes the pulley 76 pressed against the drive cable 32 and the support member 82 rotatably supporting the pulley 76. However, not limited thereto, a non-rotating body including a sliding contact surface pressed against the drive cable 31 or 32 may serve as the tension applying member. The first tension applying apparatus 51 may be configured to directly bias the rotation shaft 75*a* of the pulley 75 with the omission of the support member 81.

In the aforementioned embodiment, the drum housing portion 61 is obtained by the assembly of the cover member 64 on the housing 63. However, not limited thereto, the construction of the housing member may be arbitrarily changed. In addition, the biasing member 74 is not necessarily housed within the housing member.

In the aforementioned embodiment, the holding member 100 includes the angular tube portion 101 including the opening end and the elongated configuration in the substantially angular tube form. The pulley 75, the support member 81 and the coil spring 83 are retained within the angular tube portion 101. Then, the angular tube portion 101 serves as the guide portion to thereby restrict the moving directions of the pulley 75 and the support member 81 biased by the coil spring 83. However, not limited thereto, the construction of the holding member 100 including the guide portion may be arbitrarily changed. The position where the rotation shaft 100*a* is arranged is also not necessarily limited to the base end side of the angular tube portion 101.

In the aforementioned embodiment, the first tension applying apparatus 51 includes the rotation restriction member 117 which may restrict the rotation of the holding member 100. The rotation restriction member 117 may restrict the rotation of the holding member 100 at the rotation position at which the rotation shaft 75*a* of the pulley 75 is in a state being inserted to be positioned within the first guide grooves 91 and 93, i.e., at the rotation position at which the pulley 75 biased by the coil spring 83 should apply the tensile force to the drive cable 31. However, not limited thereto, the rotation restriction member 117 may be configured to restrict the rotation of the holding member 100 at the rotation position at which the pressing angle of the pulley 75 relative to the first drive cable 31 is shallow. The rotation restriction member 117 may be also configured not to include such holding member 100. In this case, it may be configured that the rotation of the holding member 100 is restricted at the rotation position at which the pulley 75 should apply the tensile force to the first cable 31 and at the rotation position at which the pressing angle of the pulley 75 is shallow on a basis of configurations and arrangements of the first guide grooves 91, 92 and the second guide grooves 111, 113.

In the aforementioned embodiment, each of the second guide grooves 111 and 113 includes the configuration so that the biasing force is stored at the coil spring 83 retained at the holding member 100 by the movement of the pulley 75 in the separating direction from the first guide grooves 91 and 93. However, not limited thereto, it may be configured that the biasing force of the coil spring 83 is not changed by the movement of the tension applying member 73 guided by the second guide grooves 111 and 113. Each of the second guide grooves 111 and 113 may include the configuration so that the biasing force is stored at the coil spring 83 by the movement of the pulley 75 in a direction approaching the guide grooves 91 and 93. By employing such construction, in a case where the tension applying member 73 is temporarily held, the holding member 100 may easily rotate with the biasing force of the biasing member 74.

In addition, in the aforementioned embodiment, the engagement portion 115 which may engage the tension applying member 73 with each of the second guide grooves 111 and 113 is provided at each of the second guide grooves 111 and 113 at the rotation position of the holding member 100 at which the pressing angle of the tension applying member 73 is shallow. The engagement portion 115, however, may be not necessarily provided.

Further, the rotation shaft 75*a* of the pulley 75 may not be necessarily inserted to be positioned within the first guide grooves 91, 93 and the second guide grooves 111, 113. The construction where the first guide grooves 91, 93 and the second guide grooves 111, 113 are not provided at the housing member may be employed. In this case, for example, it may be configured that the rotation of the holding member 100 may be restricted by the rotation restriction member 117 even at the rotation position at which the pulley 75 should apply the tensile force to the first drive cable 31.

In the aforementioned embodiment, the engagement member 120 includes the outer configuration in a substantially rectangular flat plate. Then, the first and second operation flanges 141 and 142 serving as the operation portions are provided at the longitudinally opposed ends of the engagement member 120. However, not limited thereto, the configuration of the engagement member 120 may be arbitrarily changed.

In the aforementioned embodiment, the engagement member 120 slides on the outer peripheral surface 63*s* of the housing 63 so as to engage and disengage relative to the axial portion 88 of the support member 82 which protrudes at the outer peripheral surface 63*s* of the housing 63 via the penetration bore 121 provided at the peripheral wall 63*d*. However, not limited thereto, the engagement member 120 may be configured to be held at the inner side of the housing member, for example. Then, the tension applying member 73 may be configured to engage with the cover member 64.

In the aforementioned embodiment, the engagement member 120 is operated by the pressing of any one of the operation flange 141 serving as the first operation portion protruding to the side of the cover member 64 and the operation flange 142 serving as the second operation portion protruding to the side of the bottom wall 63*c* of the housing 63. However, not limited thereto, the operation direction of the engagement member 120 may be arbitrarily changed as long as the operation portion is operated in the direction being retracted into the outline of the housing member.

In the aforementioned embodiment, the engagement member 120 causes the support member 82 to engage with the housing 63 in a state where the axial portion 88 of the support member 82 serves as the engagement protruding portion. However, not limited thereto, the configuration of the engagement protruding portion may be arbitrarily changed. In such case, as for the insertion bore 130 at the engagement member 120, the configurations of the first and second bore portions 131 and 132 may be changed so as to conform to the configuration of the engagement protruding portion.

Next, technical ideas obtainable by the aforementioned embodiment are described together with their effects.

(1) The tension applying apparatus where the tension applying member includes the pulley that is rotatably supported. Accordingly, without disturbing the operation of the drive cable, the tensile force is applicable to the drive cable against which the tension applying member is pressed.

(2) The tension applying apparatus where the biasing member serves as the coil spring that generates the biasing force depending on the elastic deformation amount in a state where the biasing member is compressed between the contact surface provided within the housing member and the support member. By employing such construction, the tension applying member is stably and securely biased to be pressed against the drive cable. Then, there is an advantage that the biasing member may be arranged in a compact manner.

(3) The tension applying apparatus where the biasing member generates the biasing force depending on the elastic deformation amount, and where the second guide groove includes the configuration so that the biasing force is stored at the biasing member by the movement of the tension applying member along the second guide groove in the direction approaching the first guide groove.

According to the aforementioned construction, in a case where the tension applying member is temporarily held, the holding member may easily rotate with the biasing force stored at the biasing member. As a result, the improved operability may be secured.

(4) The tension applying apparatus is configured so that the rotation shaft of the pulley inserted to be positioned within the first guide groove and the second guide groove protrudes to the outside of the housing member. According to such construction, the holding member may easily rotate by the operation of the rotation shaft of the pulley protruding to the outside of the housing member.

(5) The contact surface is provided at the holding member. According to such construction, regardless of the rotation position of the holding member, the coil spring may maintain a state expanding and contracting in the axial direction. As a result, an appropriate tensile force is applicable to the drive cable against which the tension applying member biased by the coil spring is pressed.

(6) The tension applying apparatus includes the tension applying member applying the tensile force to the drive cable by being pressed against the drive cable, the biasing member generating the biasing force for pressing the tension applying member against the drive cable, the housing member housing the tension applying member and the engagement member which may bring the tension applying member to engage with the housing member at a position at which the biasing force is stored at the biasing member, the engagement member including the operation portion protruding from the outline of the housing member, the engagement member releasing the engagement of the tension applying member in a state where the operation portion is operated in a direction being retracted into the outline.

According to the aforementioned construction, even when a protruding amount of the operation portion protruding from the outline of the housing member is restrained, the engagement member may be operated easily and securely. As a result, the improved operability may be secured.

(7) The tension applying apparatus where the engagement member includes the second operation portion protruding from the outline of the housing member in the direction where the first operation portion is retracted into the outline, and where the engagement member causes the tension applying member to engage with the housing member at the position at which the biasing force is stored at the biasing member in a state where the second operation portion is operated in the direction being retracted into the outline.

According to the aforementioned construction, by a simple operation that is intuitively understandable, the engagement operation of the tension applying member with the housing member may be performed. As a result, the improved operability may be secured.

(8) The tension applying apparatus is characterized in that the engagement member is configured so that while one of the first and second operation portions is retracted into the outline, the other of the first and second operation portions protrudes from the outline in the retracted direction.

According to the aforementioned construction, at the same time as the engagement operation of the tension applying member with the housing member is completed, the preparation operation necessary for releasing the aforementioned engagement state is completed. As a result, with the simple construction, the improved operability may be secured.

(9) The tension applying apparatus where the engagement member includes the insertion bore including the first and second bore portions which are continued in the operation direction of the engagement member, where the tension applying member includes the engagement protruding portion inserted to be positioned within the insertion bore at the position at which the tension applying member engages with the housing member, the first bore portion including the configuration which allows insertion and removal of the engagement protruding portion in the moving direction of the tension applying member biased by the biasing member, the second bore portion including the configuration which may restrict removal of the engagement protruding portion in the moving direction of the tension applying member biased by the biasing member in a state where the second bore portion engages with the engagement protruding portion, where the insertion bore is configured so that the engagement protruding portion inserted to be positioned within the insertion bore relatively moves between the first and second bore portions by the operation of the engagement member.

According to the aforementioned construction, with the simple construction, the engagement member which may engage the tension applying member with the housing member by operating the second operation portion in the retracted direction and which may release the engagement of the tension applying member by operating the first operation portion in the retracted direction may be provided.

(10) The tension applying apparatus where the tension applying member includes the engagement protruding portion at the position at which the biasing force is stored at the biasing member and the housing member includes the wall portion which includes the penetration bore into which the engagement protruding portion is inserted to be positioned, where the engagement member is configured to engage and disengage relative to the engagement protruding portion of the tension applying member inserted to be positioned within the penetration bore by sliding on the wall surface of the wall portion facing an opposite side of the tension applying member.

According to the aforementioned construction, with the simple construction, the tension applying member may securely engage with the housing member and such engagement may be securely disengaged by the engagement member.

The invention claimed is:

1. A tension applying apparatus configured for operation of a door of a vehicle, the tension applying apparatus comprising:

- a tension applying member applying a tensile force to a drive cable by being pressed against the drive cable;
- a biasing member generating a biasing force to press the tension applying member against the drive cable;
- a holding member including a guide portion which guides a movement of the tension applying member; and
- a housing member housing the tension applying member and the holding member, wherein:

- the holding member includes a rotation shaft that is supported by the housing member, the holding member being configured to change the movement of the tension applying member when the holding member rotates about the rotation shaft;
- the pressing of the tension applying member against the drive cable causes the drive cable to define a pressing angle, and as the holding member rotates about the rotation shaft the pressing angle changes from a first angle to a second angle, the first angle being smaller than the second angle;
- the housing member includes a holding structure configured to retain the holding member in a position to which the holding member rotates such that the pressing angle changes to the second angle;
- the housing member includes a first guide groove guiding the tension applying member which is biased by the biasing member in a pressing direction in which the tension applying member is pressed towards the drive cable and a separating direction in which the tension applying member moves away from the drive cable, and a second guide groove extending from and intersecting with the first guide groove and allowing the rotation of the holding member; and
- the tension applying member maintains contact with the drive cable throughout rotation of the holding member.

2. The tension applying apparatus according to claim 1, wherein, the first guide groove and the second guide groove communicate with each other, the biasing member generates the biasing force depending on an elastic deformation amount of the biasing member, and the second guide groove includes a configuration configured to store the biasing force at the biasing member by a movement of the tension applying member guided by the second guide groove in a direction separating from the first guide groove.

3. The tension applying apparatus according to claim 1, wherein the second guide groove includes an engagement portion which causes the tension applying member to engage with the second guide groove at a rotation position of the holding member at which the pressing angle changes to the second angle.

4. The tension applying apparatus according to claim 1, comprising a rotation restriction member restricting the rotation of the holding member.

5. A drum apparatus configured for operation of a door of a vehicle, the drum apparatus comprising:

a motor;

drum rotating by the motor serving as a drive source;

a drum housing portion housing the drum; and a tension applying apparatus provided at the drum housing portion, the tension applying apparatus including:

a tension applying member applying a tensile force to a drive cable by being pressed against the drive cable;

a biasing member generating a biasing force for pressing the tension applying member against the drive cable;

a holding member including a guide portion which restricts a movement of the tension applying member; and a housing member housing the tension applying member and the holding member, wherein:

the holding member includes a rotation shaft that is supported by the housing member, the holding member being configured to change the movement of the tension applying member when the holding member rotates about the rotation shaft;

the pressing of the tension applying member against the drive cable causes the drive cable to define a pressing angle, and as the holding member rotates about the rotation shaft the pressing angle changes from a first angle to a second angle, the first angle being smaller than the second angle;

the housing member includes a holding structure configured to retain the holding member in a position to which the holding member rotates such that the pressing angle changes to the second angle;

the housing member includes a first guide groove guiding the tension applying member which is biased by the biasing member in a pressing direction in which the tension applying member is pressed towards the drive cable and a separating direction in which the tension applying member moves away from the drive cable, and a second guide groove extending from and intersecting with the first guide groove and allowing the rotation of the holding member; and the tension applying member maintains contact with the drive cable throughout rotation of the holding member.

6. An opening and closing body drive apparatus for a vehicle, comprising:

an opening and closing body;

a plurality of guide rails;

a plurality of guide roller units connecting the opening and closing body and the guide rails to one another; and a tension applying apparatus including:

a tension applying member applying a tensile force to a drive cable by being pressed against the drive cable;

a biasing member generating a biasing force for pressing the tens on applying member against the drive cable;

a holding member including a guide portion which restricts a movement of the tension applying member; and a housing member housing the tension applying member and the holding member, wherein:

the holding member includes a rotation shaft that is supported by the housing member, the holding member being configured to change the movement of the tension applying member when the holding member rotates about the rotation shaft;

the pressing of the tension applying member against the drive cable causes the drive cable to define a pressing angle, and as the holding member rotates about the rotation shaft the pressing angle changes from a first angle to a second angle, the first angle being smaller than the second angle;

the housing member includes a holding structure configured to retain the holding member in a position to which the holding member rotates such that the pressing angle changes to the second angle;

the housing member includes a first guide groove guiding the tension applying member which is biased by the biasing member in a pressing direction in which the tension applying member is pressed towards the drive cable and a separating direction in which the tension applying member moves away from the drive cable, and a second guide groove extending from and intersecting with the first guide groove and allowing the rotation of the holding member; and the tension applying member maintains contact with the drive cable throughout rotation of the holding member.

* * * * *